United States Patent
Moujdin

(10) Patent No.: US 11,981,585 B2
(45) Date of Patent: May 14, 2024

(54) SUSTAINABLE AUTO PULSED ELECTROMAGNETIC IRRADIATION SYSTEM FOR ZERO DISCHARGE WATER TREATMENT

(71) Applicant: King Abdulaziz University, Jeddah (SA)

(72) Inventor: Iqbal Ahmed Moujdin, Jeddah (SA)

(73) Assignee: King Abdulaziz University, Jeddah (SA)

( * ) Notice: Subject to any disclaimer, the term of this patent is extended or adjusted under 35 U.S.C. 154(b) by 518 days.

(21) Appl. No.: 17/146,525

(22) Filed: Jan. 12, 2021

(65) Prior Publication Data

US 2022/0220010 A1    Jul. 14, 2022

(51) Int. Cl.
*C02F 1/30* (2023.01)
*B01D 1/00* (2006.01)
(Continued)

(52) U.S. Cl.
CPC ............ *C02F 1/302* (2013.01); *B01D 1/0029* (2013.01); *B01D 5/0066* (2013.01); *C02F 1/043* (2013.01);
(Continued)

(58) Field of Classification Search
CPC .... B01D 1/0029; B01D 5/0006; B01D 5/006; B01D 5/0066; C02F 1/008; C02F 1/043;
(Continued)

(56) References Cited

U.S. PATENT DOCUMENTS

| 3,577,322 A | 5/1971 | Nesbitt et al. |
| 3,607,664 A | * 9/1971 | Mascarello ............. F01K 17/04 |
| | | 202/205 |

(Continued)

FOREIGN PATENT DOCUMENTS

| CN | 1579950 A | 2/2005 |
| CN | 100491265 C | 5/2009 |

(Continued)

OTHER PUBLICATIONS

Agrawal, Multicomponent Distillation Columns with Partitions and Multiple Reboilers and Condensers, Mar. 14, 2000, p. 1 (Year: 2000).*

(Continued)

*Primary Examiner* — Clare M Perrin
(74) *Attorney, Agent, or Firm* — Oblon, McClelland, Maier & Neustadt, L.L.P.

(57) ABSTRACT

A pulsed electromagnetic irradiation system for water treatment including raw water supply unit in fluid communication with a reaction vessel, a multimode cavity in which the reaction vessel is partially positioned. A magnetron generator is positioned adjacent the multimode cavity and is electromagnetically coupled with liquid within the reaction vessel. A stirring motor is positioned adjacent a bottom surface of multimode cavity and operatively coupled with the reaction vessel to stir the liquid within reaction vessel. A parabolic arm air cooled condenser is terminally connected to the reaction vessel to be in fluid communication with the reaction vessel. A gravity vacuum funnel, where the gravity vacuum funnel is in communication with a first air/water cooled condenser. The first air/water cooled condenser outputs fresh water to a fresh water storage unit.

11 Claims, 11 Drawing Sheets

(51) Int. Cl.
    *B01D 5/00*           (2006.01)
    *C02F 1/04*           (2023.01)
    *C02F 1/28*           (2023.01)
    *H05B 6/64*           (2006.01)
    *H05B 6/76*           (2006.01)
    *H05B 6/80*           (2006.01)
    *C02F 103/08*        (2006.01)

(52) U.S. Cl.
    CPC .............. *C02F 1/048* (2013.01); *C02F 1/281* (2013.01); *C02F 1/283* (2013.01); *C02F 1/288* (2013.01); *H05B 6/6402* (2013.01); *H05B 6/6452* (2013.01); *H05B 6/76* (2013.01); *H05B 6/804* (2013.01); *C02F 2103/08* (2013.01); *C02F 2201/009* (2013.01); *C02F 2209/02* (2013.01); *C02F 2209/03* (2013.01); *C02F 2209/05* (2013.01); *C02F 2209/40* (2013.01); *H05B 2206/045* (2013.01)

(58) Field of Classification Search
    CPC .......... C02F 1/048; C02F 1/281; C02F 1/283; C02F 1/288; C02F 1/302; C02F 2103/08; C02F 2201/009; C02F 2209/005; C02F 2209/008; C02F 2209/02; C02F 2209/03; C02F 2209/05; C02F 2209/40
    See application file for complete search history.

(56) References Cited

U.S. PATENT DOCUMENTS

| | | | |
|---|---|---|---|
| 4,285,774 A | 8/1981 | Rajamannan | |
| 4,313,798 A | 2/1982 | Myers, Jr. | |
| 5,711,857 A | 1/1998 | Armstrong | |
| 5,951,825 A * | 9/1999 | Land | B01D 5/0006 202/83 |
| 10,632,396 B2 | 4/2020 | Ju et al. | |
| 2005/0236335 A1* | 10/2005 | Karaman | C02F 9/00 210/284 |
| 2006/0006171 A1* | 1/2006 | Sedlmayr | H05B 6/70 219/688 |
| 2017/0303571 A1* | 10/2017 | Alden | B01D 3/10 |
| 2018/0065865 A1* | 3/2018 | Ahmed | C02F 1/043 |
| 2018/0104653 A1* | 4/2018 | Zhang | C02F 1/44 |
| 2019/0321747 A1* | 10/2019 | Kremerman | B01D 5/0063 |
| 2019/0352194 A1* | 11/2019 | Thiers | C02F 1/28 |

FOREIGN PATENT DOCUMENTS

| | | |
|---|---|---|
| CN | 100591628 C | 2/2010 |
| KR | 10-0421331 B1 | 3/2004 |
| KR | 20090117278 A * | 11/2009 |
| KR | 10-1506312 B1 | 3/2015 |

OTHER PUBLICATIONS

Winquist et al., Multicomponent analysis of drinking water by a voltammetric electronic tongue, Nov. 3, 2010, p. 1 (Year: 2010).*
Eapen et al., An Overview on Activated Carbon and Zeolites in Water Treatment, 2016, p. 1-3 (Year: 2016).*
K&J Magnetics Inc, Stir Bars, Jun. 27, 2012, p. 1 (Year: 2012).*
Tech FAQ, How Do Microwaves Work?, Feb. 3, 2018, p. 1-3 (Year: 2018).*
Union, Benefits of Renewable Energy Use, Jul. 14, 2008 (Year: 2008).*
Machine translation of KR-20090117278-A, pp. 1-12. (Year: 2009).*
Sagar Roy, et al., "Microwave-Induced Desalination via Direct Contact Membrane Distillation", ACS Sustainable Chemistry & Engineering, vol. 6, No. 1, Nov. 7, 2017, pp. 626-632 (Abstract only).
H. Khafajeh, et al., "Studying different design parameters of a microwave preheating system in solar desalination", Desalination and Water Treatment, vol. 57, May 2016, pp. 11712-11720.

* cited by examiner

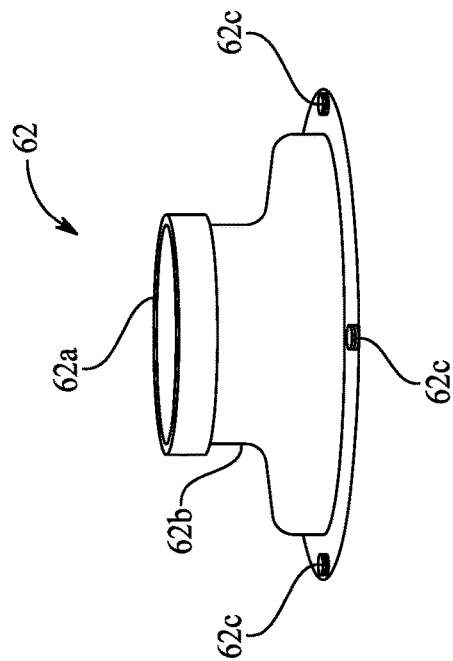
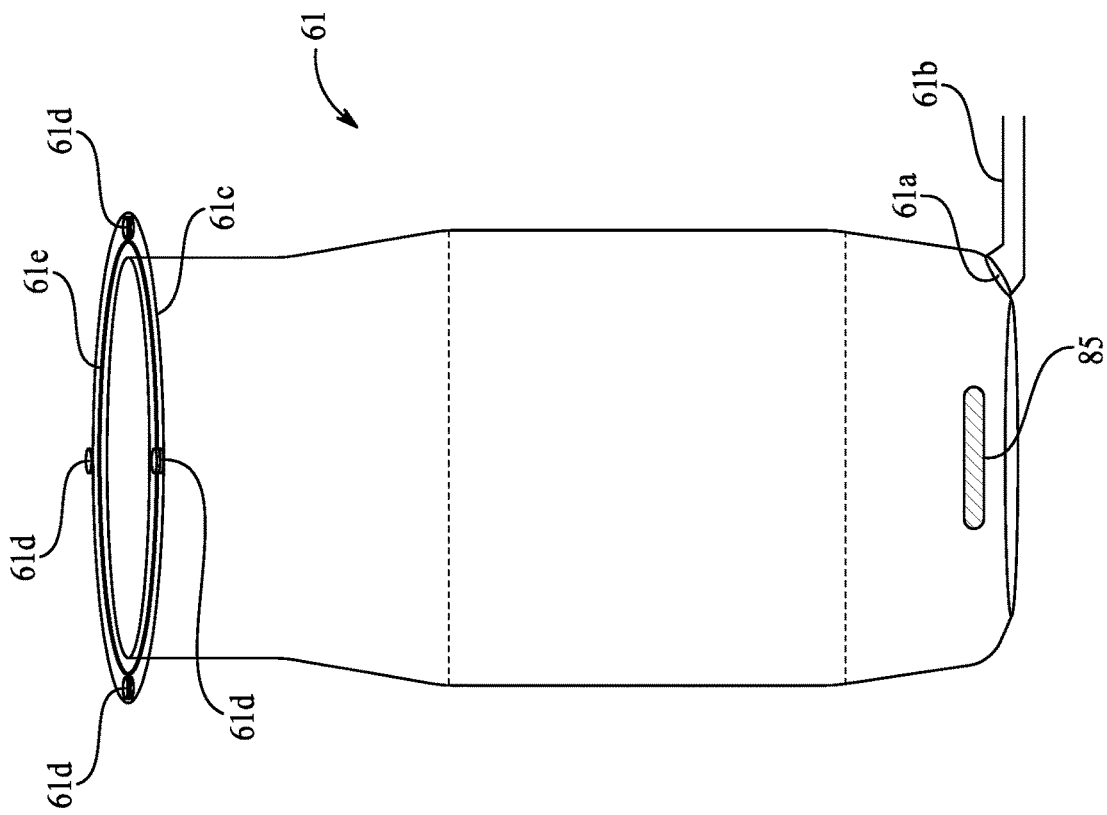
FIG. 3B
FIG. 3A

SUSTAINABLE AUTO PULSED ELECTROMAGNETIC IRRADIATION SYSTEM FOR ZERO DISCHARGE WATER TREATMENT

TECHNICAL FIELD

An auto pulsed electromagnetic irradiation water treatment system for zero discharge water treatment.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water treatment is generally carried out before using the water for commercial and domestic purposes. Particularly, hardwater may have to be treated before being supplied to commercial and domestic use. Water sources may include riverwater, rainwater, seawater and the like. Seawater is plentiful as compared to other sources. However, seawater is typically very hard due to various dissolved salts. Treatment of seawater for commercial and domestic purposes is known as seawater desalination. For seawater desalination, thermal water treatment techniques, such as multi-stage flash (MSF) distillation, multi-effect distillation (MED), and membrane technology have been used. However, the thermal water treatment techniques have several issues such as, high energy cost, heat loss, scaling, fouling and corrosion in the water treatment devices.

Another water treatment technique using reverse osmosis (RO) membrane technology has been widely applied in seawater desalination owing to its high recovery ratio of freshwater from seawater. The above techniques produce a large volume of freshwater from seawater, leading to generation of a large amount of concentrated saline water as a byproduct. The concentrated saline water is discharged into the sea leading to environmental issues and causing a threat to marine life.

Another widely used technique for seawater desalination is the membrane distillation (MD) technique. In the MD technique, feedwater is forced onto a surface of the membranes. The membranes selectively allow fresh water to pass while retaining the undesired salts. However, the MD technique involves several challenges and limitations, such as poor permeation rate and high energy consumption. Further, fouling and scaling issues are severe problems in thermal and membrane-based water treatments. A chemical treatment may be required to remove the scaling and fouling, which may lead to another environmental issue due to disposal of residual chemically treated water.

In recent years, microwave water treatment has become an attractive technology for water treatment applications. As compared to thermal water treatment techniques, microwave water treatment works by volumetric heating. Due to extreme rotation, hydrogen and oxygen molecules in the water rapidly heat within a short time. Consequently, freshwater molecules disassociate from solutes in the seawater. Also, the microwave water treatment can operate at ambient pressure, rapidly disassociate the water molecules from solid, liquid, or other solutes within a short treatment cycle, and generally perform without the significant scaling as observed in the other techniques.

Further, microwave induced desalination techniques via direct contact membrane distillation have been described. (See: Roy, S., Humoud, M. S., Intrchom, W and Mitra, S. "Microwave Induced Desalination via Direct Contact Membrane Distillation". ACS Sustainable Chem. Eng. 2018, 6, 1, 626-632, incorporated herein by reference in its entirety). In this disclosure, microwave radiation was used to heat the saline water for membrane distillation. The permeate flux from microwave radiation was distinguished from that produced by conventional heating, and an enhancement as high as 52% over conventional heating was observed. Since microwave irradiation works well in the presence of salts at high concentration, the flux enhancement at such high salinity was more significant, and the corresponding mass transfer coefficient at 150K ppm was about 99% higher than that obtained using traditional heating.

Another study of microwave preheating systems indicated that the microwave heating rate reduced with increasing water salinity and the microwave performance increased with increasing microwave power as well as with water sample volume. (See: Khafajeh, H., Banakar, A and Khoshtaghaza, M. H. "*Studying different design parameters of a microwave preheating system in solar desalination*". 2016, 57, 11712-11720, incorporated herein by reference in its entirety). Other microwave techniques for treating water have been studied. (See: Kingston, H. M. and Jassie. "*Introduction to Microwave Sample Preparation*" American Chemical Society, Washington, D. C. pp 9-16; Fini. A.; Breccia. A. "Chemistry by microwaves", Pure Applied Chemical. 71(4): 573-579, 1999, each incorporated herein by reference in its entirety). Yet another microwave assisted technique has been described. (See: Iqbal Ahmed. "*High performance ultrafiltration polyethersulfone Membrane using microwave assisted technique*". PhD Dissertation, University Technology Malaysia, 2008/2009, incorporated herein by reference in its entirety).

In addition to the above techniques, a single-stage flash distillation system was described in U.S. Pat. No. 3,577,322 A, "Microwave heating in the desalination of water", incorporated herein by reference in its entirety. The single-stage flash distillation system provides an economical means of desalting water at a scale of less than 15,000 gallons per day to multi-millions of gallons per day.

A microwave distillation apparatus was described in U.S. Pat. No. 4,285,774 A, "Microwave distillation", incorporated herein by reference in its entirety. The microwave distillation apparatus is used for extrication of alcohol from beer whereby the beer is progressively passed through a horizontal closed reservoir wherein the alcohol is preheated and separated by microwave energy, the lower concentrations of alcohol being collected and returned to concentrator cells for recycling therethrough. Another microwave distillation apparatus is described in U.S. Pat. No. 4,313,798 A, "Micro-wave powered distillation unit", incorporated herein by reference in its entirety, in which microwave power is utilized for vaporizing fluid to be purified. Further, a microwave distillation apparatus is described in U.S. Pat. No. 5,711,857 A, "Microwave distillation apparatus" incorporated herein by reference in its entirety. In this patent, a microwave heating cavity includes a vessel for holding liquid to be distilled.

A microwave power distillation apparatus is described in U.S. Patent Application No. US 2006/0006171 A1, "Distillation and distillate method by microwaves", incorporated herein by reference in its entirety. Separately, a method of sea water desalination at large volume by microwave transmission is described in Chinese Application No.

CN1579950A, "Desalination method of sea water by microwave transmission", incorporated herein by reference in its entirety. In the Chinese patent application, microwave radiation is used to heat seawater. The seawater is then vaporized and cooled to get freshwater. A system of seawater desalination and poor-quality water purification and method is also described in Chinese Patent No. 100591628C, "Sea water desalination and poor water purification device and method", incorporated herein by reference in its entirety. In addition, a microwave-assisted distillation system is described in U.S. Patent Application No. US 2018/0065865 A1, "Microwave-assisted distillation system", incorporated herein by reference in its entirety.

None of the systems and methods described above have the capability to treat waste water or seawater and obtain fresh water at large scales with zero discharge.

Accordingly, it is one object of the present disclosure to provide systems and methods for operating a water treatment plant to produce clean water with zero discharge.

SUMMARY

In an exemplary embodiment, a pulsed electromagnetic irradiation system for water treatment is described, including a raw water supply unit, where the raw water supply unit is in fluid communication with a reaction vessel through a water pump; a multimode cavity, where the reaction vessel is partially positioned into the multimode cavity; a magnetron generator, where the magnetron generator is laterally and angularly positioned adjacent the multimode cavity, where the magnetron generator is electromagnetically coupled with a liquid within the reaction vessel; a stirring motor, where the stirring motor is positioned adjacent a bottom surface of the multimode cavity, where the stirring motor is operatively coupled with the reaction vessel to stir the liquid within the reaction vessel; a parabolic arm air cooled condenser, where the parabolic arm air cooled condenser is terminally connected to the reaction vessel to be in fluid communication with the reaction vessel; and a gravity vacuum funnel, where the gravity vacuum funnel is in communication with a first air/water cooled condenser to transfer water vapor output of the parabolic arm air cooled condenser to the first air/water cooled condenser, and wherein the first air/water cooled condenser outputs a fresh water stream to a fresh water storage unit.

In another exemplary embodiment, a pulsed electromagnetic irradiation method for water treatment is described, including pumping raw water from a reserve water reservoir through a first air/water cooled condenser and a third air/water cooled condenser; cooling the raw water in the first air/water cooled condenser and the third air/water cooled condenser to generate a fluid stream of cooled feed water; providing the fluid stream of cooled feed water into a reaction vessel through an intake port of a parabolic arm air cooled condenser; generating microwaves in a magnetron generator; heating the cooled feed water in the reaction vessel by the microwaves until the feed water vaporizes to water vapor; providing the water vapor to the parabolic arm air cooled condenser to output the water vapor into the first air/water cooled condenser and the third air/water cooled condenser; condensing the water vapor in the first air/water cooled condenser and the third air/water cooled condenser to generate a fluid stream of fresh water; and filtering the fresh water in a fresh water storage unit to generate drinking water.

In another exemplary embodiment, a pulsed electromagnetic irradiation system for water treatment is described, including a raw water supply unit; a water pump configured to pump-raw water to a reaction vessel; a multimode cavity surrounding the reaction vessel; a magnetron generator laterally and angularly positioned adjacent the multimode cavity, where the magnetron generator is configured to generate microwaves to heat the raw water in the reaction vessel and convert the raw water to water vapor; a stirring motor positioned adjacent a bottom surface of the multimode cavity, where the stirring motor is configured to stir the raw water within the reaction vessel; a parabolic arm air cooled condenser terminally connected to the reaction vessel, the parabolic arm air cooled condenser configured to provide the water vapor to the first air/water cooled condenser and the third air/water cooled condenser; and the first air/water cooled condenser and the third air/water cooled condenser configured to condense the water vapor generate a water output and transfer the water output to a fresh water storage unit.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A is a schematic diagram of a feed reactor of the pulsed magnetic irradiation system, according to exemplary aspects of the present disclosure;

FIG. 3B is a schematic diagram of a lid of the pulsed magnetic irradiation system, according to exemplary aspects of the present disclosure;

DETAILED DESCRIPTION

Figure 1:
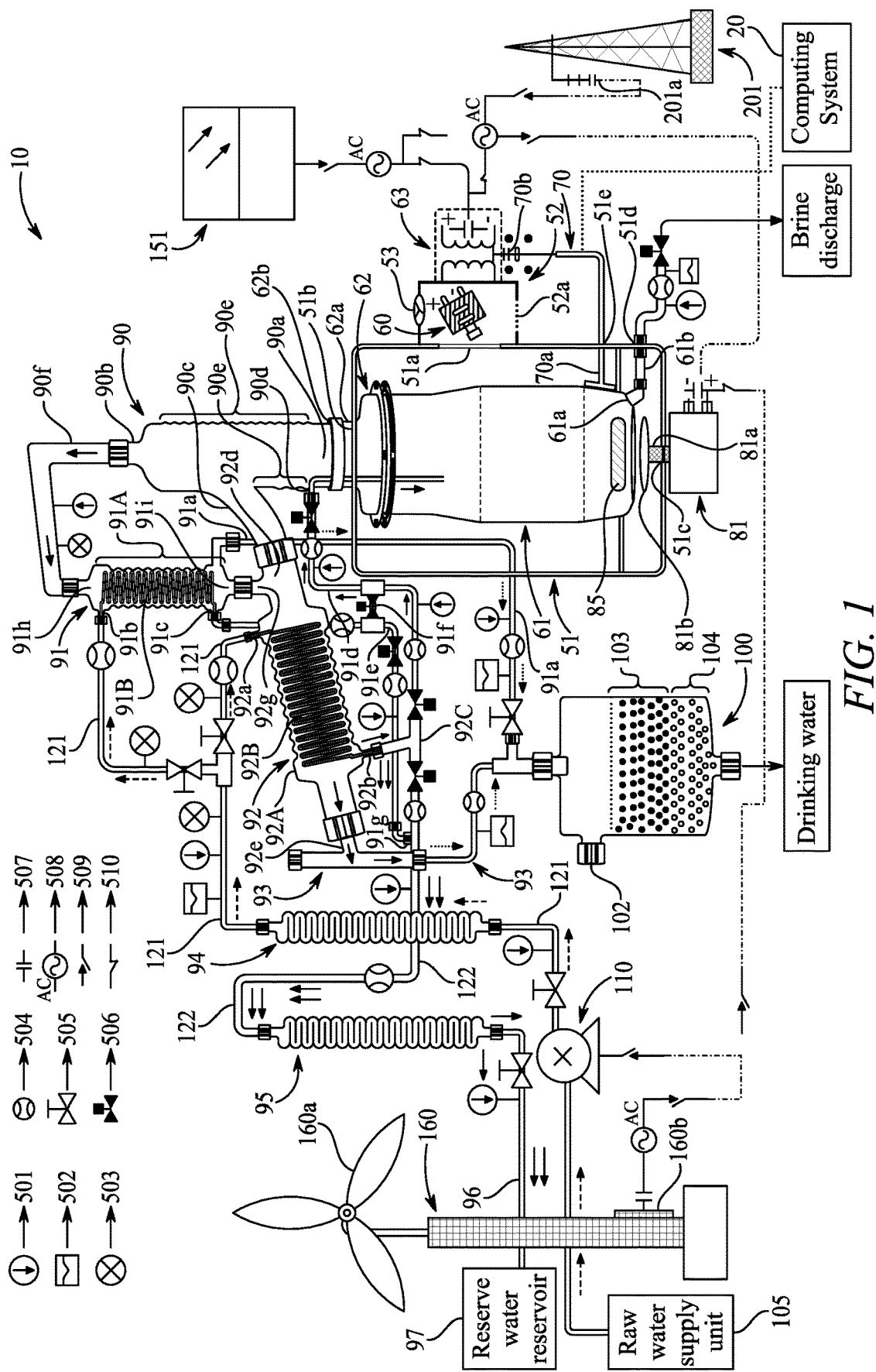
FIG. 1 is a schematic diagram of a pulsed magnetic irradiation system for water treatment, according to exemplary aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a pulsed electromagnetic irradiation method and system for zero discharge water treatment.

According to an aspect of the present disclosure, the pulsed electromagnetic irradiation system is a sustainable system for zero discharge water treatment. In an aspect, the water treatment involves processes for liquid separation and purification. In an aspect, the pulsed electromagnetic irradiation system utilizes microwave pulses to heat a liquid (or solution) rapidly and economically to be distilled with respect to liquid volume (or solution volume). Although it has been described that the pulsed electromagnetic irradiation system is used for water treatment, in some aspects of the present disclosure the pulsed electromagnetic irradiation system may also be used in beverage industries, sugar industries, dairy industries, petroleum industries, and petrochemical industries for various applications.

Exemplary specifications of a pulsed electromagnetic irradiation system are presented in Table 1 provided below.

TABLE 1

Specifications of the pulsed electromagnetic irradiation system 10

| Product | Customized auto pulsed electromagnetic irradiation system |
| --- | --- |
| Frequency | 2450 MHz |
| Power consumption | 220 V~50 Hz |
| Power outlet | 800 Watt |
| Pulsed level | Low, Medium-low, Medium, Medium-high and High |
| Power level (watts) | 100-800 |
| Cavity dimensions | 20.527 cm (H) × 32.22 cm (W) × 30.24 cm (D) |
| Exterior dimensions | 30.40 cm (H) × 51 cm (W) × 37.9 cm (D) |
| Multimode cavity capacity | ~20000 cm$^3$ |

The pulsed electromagnetic irradiation system of the present disclosure is not limited to the working specifications of Table 1, which are listed for a system having the dimensions specified. A larger system will have higher power needs, but may process clean water in higher volumes.

FIG. 1 is a schematic diagram of a pulsed electromagnetic irradiation system 10 for water treatment.

Referring to FIG. 1, the pulsed electromagnetic irradiation system 10 includes a raw water supply unit 105 (also referred to as pre-treated raw water intake (PT-RWI 105)) to supply liquid that is to be treated. The liquid may interchangeably be referred to as raw liquid or raw water. In an example, the liquid may be at least one of seawater, brackish water, and wastewater. In some examples, the liquid may be pre-treated seawater. In an example, the liquid may be a polar liquid or a bipolar liquid. According to aspects of the present disclosure, the liquid supplied by the raw water supply unit 105 may be obtained from a reserve water reservoir 97 (also referred to as pre-treated raw water reservoir (PT-RWR 97)).

The pulsed electromagnetic irradiation system 10 also includes a water pump 110 (also referred to as centrifugal pump 110) operatively coupled to the raw water supply unit 105 and configured to pump the liquid from the raw water supply unit 105 to a feed reactor 61 that is partially positioned in a multimode cavity 51. Further, the pulsed electromagnetic irradiation system 10 includes a fresh water storage unit 100 (also referred to as air vacuum fresh water reservoir 100) designed to receive fresh water. As may be understood, the fresh water refers to liquid that has been distilled by the pulsed electromagnetic irradiation system 10. The fresh water storage unit 100 includes one or more layers of activated carbon 103 and a natural zeolite layer 104 beneath the one or more layers of activated carbon 103. The one or more layers of activated carbon 103 and the natural zeolite layer 104 are arranged to filter the fresh water entering the fresh water storage unit 100. In an example, the one or more layers of activated carbon 103 may remove odor from the fresh water, and the natural zeolite layer 104 may contribute minerals to the fresh water. The fresh water storage unit 100 also includes a first channel 102 which is configured to create air vacuum inside the fresh water storage unit 100. Fresh water output by the system may have a pH of 7.0 and be free of contaminants.

The multimode cavity 51 (also referred to as secondary settling tanks (SST) multi-mode cavity 51, microwave heating chamber 51 or multi-mode microwave cavity 51) of the pulsed electromagnetic irradiation system may be a double cover stainless-steel cavity. In an example, the multimode cavity 51 includes a plurality of stainless-steel walls. In an example, the multimode cavity 51 includes a flat roof with an insulated upper cover and multi-mode cavity. The multimode cavity 51 includes a magnetron generator 60 for generating electromagnetic radiation, which is held within the cavity walls. As can be seen in FIG. 1, the multimode cavity 51 includes a dedicated duct 51a located at a right-side wall of the multimode cavity 51. Further, the multimode cavity 51 includes a plurality (e.g., four) opening voids namely, a first opening void 51b, a second opening void 51c, a third opening void 51d, and fourth opening void 51e. The first opening void 51b is located at the roof or an upper wall of the multimode cavity 51. In a non-limiting example, a diameter of the first opening void 51b may be greater than 6 cm and less than the front of the magnetron chamber 52. Further, the second opening void 51c is located at a bottom wall of the multimode cavity 51. In an example, a diameter of the second opening void 51c may be 0.05 cm to 1 cm. The third opening void 51d is located at the right-side wall of the multimode cavity 51. In an example, the third opening void 51d is located below the dedicated duct 51a of the multimode cavity 51, i.e., at an extreme lower right side of the multimode cavity 51. In an example, a diameter of the third opening void 51d ranges from 0.25 cm to 0.5 cm.

In a non-limiting example, the height of the first opening void 51b may be greater than 6 cm and less than the height of the front of the magnetron chamber 52. Further, the second opening void 51c is located at a bottom wall of the multimode cavity 51. In an example, a diameter of the second opening void 51c may be of a size configured to receive the shaft 81a of the motor 81. The third opening void 51d is located at the right-side wall of the multimode cavity 51. In an example, the third opening void 51d is located below the dedicated duct 51a of the multimode cavity 51, i.e., at an extreme lower right side of the multimode cavity 51. In an example, a diameter of the third opening void 51d is of a size configured to receive the brine channel 61b.

The feed reactor 61 of the pulsed electromagnetic irradiation system 10 may be made of components that do not degrade or leak over a short period of use. In an example, the feed reactor 61 is made of glass, ceramic, composite glass fiber, or polypropylene. In another example, the feed reactor 61 may be made of quartz glass. In an example, a thickness of wall of the feed reactor 61 may be about 0.5 cm. In an example, the feed reactor 61 may be provided for containing sample liquid, vapors, and distilled liquid during the water treatment process or distillation process. In one embodiment of the present disclosure, the feed reactor 61 is located inside the multimode cavity 51, for example, at a center of the multimode cavity 51. In other words, the multimode cavity 51 is configured to house the feed reactor 61 such that the multimode cavity 51 surrounds the feed reactor 61. Further, the feed reactor 61 is in fluid communication with the raw water supply unit 105 through the water pump 110. In an example, the water pump 110 may be configured to pump the liquid from the raw water supply unit 105 into the feed reactor 61. The feed reactor 61 has a wide neck for receiving the liquid from the raw water supply unit 105 that is to be treated. The feed reactor 61 may also be interchangeably referred to as feed water reactor 61, a wider neck feed reactor 61, a wider head feed reactor 61, or a distillation apparatus 61.

The feed reactor 61 is concealed with a lid 62 (also referred to as wider neck lid 62 or wider head single neck lid 62) to prevent vapors from escaping from between the lid 62 and the feed reactor 61 once the liquid inside the feed reactor 61 gets heated up or boils. In an aspect of the present disclosure, the first opening void 51b of the multimode cavity 51 provides access for the lid 62 of the feed reactor 61. The lid 62 includes a neck lid 62a that is located outside the multimode cavity 51 for receiving the liquid and condensing the hot vapors that are generated as a result of heating up of the liquid. Accordingly, the feed reactor 61 is partially positioned into the multimode cavity 51. The feed reactor 61 further includes a neck head 62b. The feed reactor 61 also includes a brine outlet 61a at a bottom right corner of the feed reactor 61 to discharge brine or concentrate. According to an aspect of the present disclosure, the third opening void 51d provides an access to a second channel 61b for the brine or concentrate discharge. In an example, the feed reactor 61 may continuously discharge the brine or concentrate into the second channel 61b. As can be seen in FIG. 1, one part of the second channel 61b is positioned within the multimode cavity 51 and the other part of the second channel 61b is positioned outside the multimode cavity 51 to carry the brine or concentrate to a discharge outlet.

The pulsed electromagnetic irradiation system 10 further includes a magnetron chamber 52. The magnetron chamber 52 is attached to the right-side wall of the multimode cavity 51. The magnetron chamber 52 houses a magnetron generator 60. The magnetron generator 60 is laterally and angularly positioned adjacent the multimode cavity 51. As can be seen in FIG. 1, the magnetron generator 60 is preferably positioned at 45-degree angle with respect to the magnetron chamber 52. Also, the magnetron generator 60 is electromagnetically coupled with the liquid within the feed reactor 61, which is a polar liquid, such as brine or water.

The magnetron generator 60 is configured to produce microwave radiation for the purpose of heating the liquid contained in the feed reactor 61, thus causing the liquid within the feed reactor 61 to heat-up and evaporate. Although it has been shown that one magnetron generator 60 is placed inside the magnetron chamber 52, in some aspects of the present disclosure, more than one magnetron generator 60 may be placed inside the magnetron chamber 52.

According to an aspect of the present disclosure, the dedicated duct 51a is configured to allow microwave radiation generated by magnetron generator 60 into or inside the multimode cavity 51. Further, the feed reactor 61 has multi-mode inner cavity walls configured to reflect the microwaves generated by the magnetron generator 60 to prevent radiation leakage and increase the heating efficiency. The magnetron chamber 52 also includes an exhaust fan 53 located at a roof or an upper wall of the magnetron chamber 52. The exhaust fan 53 is provided for cooling purposes of the magnetron generator 60. Also, a power supply is provided to the magnetron generator 60 on a back wall of the magnetron chamber 52. A mesh 52a for receiving cool air is provided at a bottom wall of the magnetron chamber 52.

The pulsed electromagnetic irradiation system 10 further includes a stirring motor 81. The stirring motor 81 is positioned adjacent an exterior side of bottom surface (or a below wall) of the multimode cavity 51. Also, the stirring motor 81 is operatively coupled with the feed reactor 61 to stir the liquid within the feed reactor 61. Further, the stirring motor 81 includes a motor shaft 81a, a magnetic blade 85 preferably neodymium (also referred to as glass ball bearing magnetic stirrer 85), and a coated magnetic plate preferably neodymium 81b. According to aspects of the present disclosure, assembly of the magnetic blade 85 and the coated magnetic plate 81b may be made of high-intensity permanent magnetic plates. Further, the assembly of the magnetic blade 85 and the coated magnetic plate 81b maybe include a motor and circuitry configured to stir the liquid automatically, based on feedback or on a schedule. The motor may stir the liquid at a rate of 100-2000 rpm.

In an example, the coated neodymium magnetic plate 81b may be coated with a thick coat of Teflon or polypropylene. The coated neodymium magnetic plate 81b is operatively attached to the motor shaft 81a to rotate the neodymium magnetic blade 85. According to an aspect of the present disclosure, the coated neodymium magnetic plate 81b may be attached or embedded on a borosilicate glass ball bearing propeller or ceramic ball bearing propeller for easy rotation of the liquid.

As can be seen in FIG. 1, the motor shaft 81a is placed within the multimode cavity 51 via the second opening void 51c. The coated neodymium magnetic plate 81b is also placed within the multimode cavity 51. In an aspect of the present disclosure, the coated neodymium magnetic plate 81b is placed at a distance of about 0.3 cm under the feed reactor 61. The pulsed electromagnetic irradiation system 10 further includes a transformer 63. The transformer 63 is operatively connected to provide power from the power supply to the magnetron generator 60. Additionally, the pulsed electromagnetic irradiation system 10 includes a hydraulic temperature control system 70 (also referred to as temperature sensor controller 70). In an example, the surface of the hydraulic temperature control system 70 may include an external coating of one of silver and aluminum. The hydraulic temperature control system 70 includes a first section and a second section. The first section is positioned within the multimode cavity 51, and the second section is positioned along an outer wall of the multimode cavity 51. As shown in FIG. 1, the fourth opening void 51*e* of the multimode cavity 51 provides access to the hydraulic temperature control system 70 inside the multimode cavity 51. Further, the hydraulic temperature control system 70 includes a temperature sensor 70*a* and a temperature controller 70*b*. The temperature sensor 70*a* is preferably attached to a right-side wall of the feed reactor 61. In an example, the temperature sensor 70*a* is operatively connected to the brine outlet 61*a*. Further, the temperature sensor 70*a* is configured to gauge a temperature of the brine.

The temperature controller 70*b* is located outside the multimode cavity 51, adjacent to the magnetron chamber 52. The hydraulic temperature control system 70 is positioned adjacent to the magnetron power supply to control the magnetron generator 60 and a temperature of the liquid with respect to a volume of the liquid. In an example, the hydraulic temperature control system 70 is configured to control the magnetron pulse cycle concerning the volume of the liquid inside the feed reactor 61 to be distilled. In an aspect, the temperature controller 70*b* is attached hydraulically with the transformer 63. In an example, the temperature controller 70*b* is located between the transformer 63 and the power supply. Further, the temperature controller 70*b* is operatively connected to switch power to the magnetron generator 60 on and off based on the temperature of the brine.

The pulsed electromagnetic irradiation system 10 further includes a parabolic arm air cooled dome condenser 90 (also referred to as air cooled dome condenser 90). In an example, the parabolic arm air cooled dome condenser 90 is made of glass, ceramic, and/or polypropylene. The parabolic arm air cooled dome condenser 90 is terminally connected to the feed reactor 61 to be in fluid communication with the feed reactor 61. In an example, the parabolic arm air cooled dome condenser 90 may carry out a free convection phenomenon. As can be seen in FIG. 1, the parabolic arm air cooled dome condenser 90 is placed vertically inside the neck lid 62*a* of the lid 62 of the feed reactor 61. Further, the parabolic arm air cooled dome condenser 90 includes a bottom portion, referred to as opening mouth tail 90*a*. According to an aspect of the present disclosure, the opening mouth tail 90*a* of the parabolic arm air cooled dome condenser 90 is hermetically sealed with the neck head 62*b* of the lid 62 of the feed reactor 61. The opening mouth tail 90*a* is configured to collect hot distilled vapors or hot distilled vapor fumes from the feed reactor 61, and the hot distilled vapors are present inside a shell of the parabolic arm air cooled dome condenser 90. Further, as can be seen in FIG. 1, an outside surface of the parabolic arm air cooled dome condenser 90 has waveform walls 90*e* configured to provide an increased surface area for heat released from a surface of the parabolic arm air cooled dome condenser 90. Also, the parabolic arm air cooled dome condenser 90 has three opening mouths namely, an upper mouth opening 90*b*, a gravity vacuum funnel 90*c*, and an intake port 90*d*. The gravity vacuum funnel 90*c* is in fluid communication with the first air/water cooled condenser 92. The upper mouth opening 90*b* is sealed with an inclined type U-tube connector 90*f* to receive upper-level hot distilled vapors from the feed reactor 61.

The pulsed electromagnetic irradiation system 10 further includes a third air/water cooled condenser 91 and a first air/water cooled condenser 92. The third air/water cooled condenser 91 and the first air/water cooled condenser 92 are confined parallel with the parabolic arm air cooled dome condenser 90. Further, each of the third air/water cooled condenser 91 and the first air/water cooled condenser 92 may carry out a combination of forced and free convection phenomenon. The third air/water cooled condenser 91 includes a first shell wall 91A and a first coil tube 91B (also referred as water-cooled coil tube 91B). In an example, the first shell wall 91A has a waveform shape. The third air/water cooled condenser 91 is attached vertically with the parabolic arm air cooled dome condenser 90 via the U-tube connector 90*f*. The third air/water cooled condenser 91 includes a condenser coil tube entrance mouth 91*b*, a first entrance mouth 91*h*, a first exit mouth 91*c*, a second exit mouth 91*i*, a first channel tube 91*d*, and a second channel tube 91*e*. According to an aspect, the hot distilled vapors are gathered within the third air/water cooled condenser 91 and condensed by the first coil tube 91B. Further, the first air/water cooled condenser 92 is positioned in a parabolic position with respect to the parabolic arm air cooled dome condenser 90. The first air/water cooled condenser 92 include a second shell wall 92A and a second coil tube 92B. In an example, the second shell wall 92A is shaped in a form of a waveform. The first air/water cooled condenser 92 includes a first receiving mouth 92*g*, a second receiving mouth 92*d*, a second entrance mouth 92*a*, and a fourth exit mouth 92*b*, and a fifth exit mouth 92*e*, and a fourth channel tube 92C.

The pulsed electromagnetic irradiation system 10 also includes a second air/water cooled condenser 94 and a fourth air/water condenser 95. The second air/water cooled condenser 94 in fluid communication with the water pump 110. In an example, surface of the first air/water cooled condenser 92, the second air/water cooled condenser 94, the third air/water cooled condenser 91, and the fourth air/water condenser 95 may include a coating of one of silver and aluminum. Further, a height of the first air/water cooled condenser 92, the second air/water cooled condenser 94, the third air/water cooled condenser 91, and the fourth air/water condenser 95 may be adjustable.

In an aspect of the present disclosure, the second air/water cooled condenser 94 is in fluid communication with the water pump 110. Also, the second air/water cooled condenser 94 is in fluid communication with the first air/water cooled condenser 92 and the third air/water cooled condenser 91. Further, the second air/water cooled condenser 94 is in fluid communication with the intake port 90*d* of the parabolic arm air cooled dome condenser 90. In an example, the second air/water cooled condenser 94 receives the liquid that is to be distilled from the raw water supply unit 105 through the water pump 110. The second air/water cooled condenser 94 is configured to cool the liquid or bring the temperature of the liquid equal to or lower than a predetermined threshold temperature. The second air/water cooled condenser 94 then passes the cooled liquid (also referred to as pre-treated cooled liquid) to the first air/water cooled condenser 92 and the third air/water cooled condenser 91.

According to aspects of the present disclosure, the condenser coil tube entrance mouth 91*b* of the third air/water cooled condenser 91 is configured to receive the cooled liquid from the second air/water cooled condenser 94. Responsive to receiving the cooled liquid, the third air/water cooled condenser 91 performs a heat exchange process on the cooled liquid. As a result of the heat exchange process, the third air/water cooled condenser 91 generates heat fluxed liquid. In an example, the heat fluxed liquid may refer to high temperature liquid or hot liquid. The temperature of the high temperature liquid may range from 100° C. to 107° C. (212° F. to 225° F.). The heated liquid then exits from the first exit mouth 91*c* of the first coil tube 91B and the heated liquid is used as a feed to the feed reactor 61 via the first channel tube 91*d*. In an example, the heated liquid flows through a water valve 91*f* into the feed reactor 61. According to aspects of the present disclosure, a portion of the heated liquid may transmit back to the reserve water reservoir 97 via the second channel tube 91*e*. As can be seen in FIG. 1, the portion of the heated liquid transmits back to the reserve water reservoir 97 through the fourth air/water condenser 95 via a third channel tube 96. In an example, the heated liquid may be transmitted back to the reserve water reservoir 97 via the third channel tube 96 by a free or forced convection phenomenon.

The second exit mouth 91*i* of the third air/water cooled condenser 91 is hermetically sealed with the first receiving mouth 92*g* of the first air/water cooled condenser 92. Further, the second receiving mouth 92*d* of the first air/water cooled condenser 92 has an integrated attachment and is hermetically sealed with the gravity vacuum funnel 90*c* of the parabolic arm air cooled dome condenser 90. Also, the first receiving mouth 92*g* of the first air/water cooled condenser 92 is configured to receive condensed liquid from the third air/water cooled condenser 91. Further, the second receiving mouth 92*d* of the first air/water cooled condenser 92 is configured to receive hot distilled vapors from the gravity vacuum funnel 90*c* of the parabolic arm air cooled dome condenser 90. Further, the second entrance mouth 92*a* of the first air/water cooled condenser 92 is configured to receive the cooled liquid from the second air/water cooled condenser 94. Further, after the heat exchange process, the heat fluxed liquid exits from the fourth exit mouth 92*b* of the first air/water cooled condenser 92. Further, the heat fluxed liquid is used as feed for the feed reactor 61 via the intake port 90*d* of the parabolic arm air cooled dome condenser 90 at a controlled flow rate, and the flow rate of the heat fluxed liquid is used according to the flow rate of distillate flow rate of vapors.

The pulsed electromagnetic irradiation system 10 further includes a plurality of fluid coupling lines configured to provide hermetically sealed fluid connection between the water pump 110 and the second air/water cooled condenser 94, the second air/water cooled condenser 94 and the third air/water cooled condenser 91, the third air/water cooled condenser 91 and the intake port 90*d* of the parabolic arm air cooled dome condenser 90, an upper mouth opening 90*b* of the parabolic arm air cooled dome condenser 90 and the first air/water cooled condenser 92, the first air/water cooled condenser 92 and the fresh water storage unit 100, the first air/water cooled condenser 92 and the fourth air/water cooled condenser 95, and the fourth air/water cooled condenser 95 and the reserve water reservoir 97.

Further, the pulsed electromagnetic irradiation system 10 includes a plurality of sensors. Each sensor includes at least one of thermocouple, a flow meter, a conductivity meter and a pressure gauge. According to aspects of the present disclosure, each fluid coupling line includes at least one sensor. For example, the pulsed electromagnetic irradiation system 10 includes a first thermocouple and a first flow meter connected between the water pump 110 and the second air/water cooled condenser 94. The pulsed electromagnetic irradiation system 10 also includes a second thermocouple, a first pressure gauge, a second flow meter, and a first conductivity meter connected between the second air/water cooled condenser 94 and the third air/water cooled condenser 91, and a third thermocouple and a third flow meter connected between the third air/water cooled condenser 91 and the intake port 90*d* of the parabolic arm air cooled dome condenser 90. The pulsed electromagnetic irradiation system 10 also includes a plurality of water valves configured to control the fluid communication in the fluid coupling lines.

According to aspects of the present disclosure, the water pump 110 and the stirring motor 81 are operatively electrically connected to a renewable energy source. The renewable energy source includes at least one of a wind power turbine 160 and a photovoltaic panel 151. Further, the magnetron generator 60 is operatively electrically connected to receive power from at least one of the photovoltaic panel 151 and a utility grid 201. In an aspect, the wind power turbine 160 may continuously supply energy 160*b* for water pump 110, and the energy generated from wind blades of the wind power turbine 160 can be used for the stirring motor 81. Further, the photovoltaic panel 151 (also referred to as solar cell panels 151) may supply power to the transformer 63 for the magnetron generator 60 and the exhaust fan 53. According to aspects of the present disclosure, power supply 201*a* from the utility grid 201 (also referred to as grid station 201) may be connected as needed for the pulsed electromagnetic irradiation system 10. In an example, the utility grid 201 may provide the power supply 201*a* as stand by power to the magnetron generator 60 and the stirring motor 81.

Also, during water distillation process, a number of quality and quantity assurance parameters may be monitored and performed within the pulsed electromagnetic irradiation system 10. Referring to FIG. 1, conductivity meter 501 is configured to continuously monitor the quality of raw feed liquid, hot distilled vapors, and condensed freshwater, respectively. Thermocouple 502 is configured to continuously monitor the temperature of a liquid stream. Pressure gauge 503 is configured to monitor the pressure of liquid stream and hot distilled vapors stream. Flow meter 504 is configured to control hot and cold liquid flow in, flow out feed in, and concentrate out. Hot water valve 505 is configured to control the flow of cold liquid stream. Cold water valve 506 is configured to control the flow of hot stream in and out, and to control the flow rate of hot liquid flow according to the process requirement. Relay contacts 507 are configured for the power supply. AC power 508 is configured for electricity conversion. Power supply 509 is configured to control and monitor power supply direction to various components of the pulsed electromagnetic irradiation system 10. Power converter 510 is configured for automatically controlling the power breaker and switches.

The raw water supply unit 105 is configured to supply liquid that is to be distilled via the water pump 110. In an example, the raw water supply unit 105 may continuously supply the liquid for distillation. For example, the liquid may be at least one of seawater, brackish water, and wastewater. In an aspect of the present disclosure, the water pump 110 is operatively electrically connected to the renewable energy source. As described above, the renewable energy source includes at least one of the wind power turbine 160 and the photovoltaic panel 151.

As can be seen in FIG. 1, the liquid flows from the raw water supply unit 105 to the second air/water cooled condenser 94 via a first fluid coupling line 121 (as illustrated by dashed line arrows). In an example, the temperature of the liquid flowing from the raw water supply unit 105 may be higher than what is desired. According to aspects of the present disclosure, the second air/water cooled condenser 94 is configured to cool the liquid or bring the temperature of the liquid equal to or lower than a predetermined threshold temperature. The second air/water cooled condenser 94 then outputs the cooled liquid. The cooled liquid then flows at equal flow rates into the first air/water cooled condenser 92 and the third air/water cooled condenser 91. As can be seen in FIG. 1, the cooled liquid flows from the second air/water cooled condenser 94 into the first air/water cooled condenser 92 and the third air/water cooled condenser 91 via the first fluid coupling line 121 (as illustrated by dashed line arrows).

The condenser coil tube entrance mouth 91b of the third air/water cooled condenser 91 is configured to receive the cooled liquid (i.e., the pretreated cooled liquid) via the first fluid coupling line 121 from the second air/water cooled condenser 94 (as illustrated by dashed line arrows). Further, the second entrance mouth 92a of the first air/water cooled condenser 92 is configured to receive the cooled liquid via the first fluid coupling line 121 from the second air/water cooled condenser 94 (as illustrated by dashed line arrows). On receiving the cooled liquid, each of the third air/water cooled condenser 91 and the first air/water cooled condenser 92 is configured to perform the heat exchange process on the cooled liquid. The third air/water cooled condenser 91 and the first air/water cooled condenser 92 then generates heat fluxed liquid which is used as a feed for the feed reactor 61. For the third air/water cooled condenser 91, the heat fluxed liquid exits from the first exit mouth 91c of the first coil tube 91B and for the first air/water cooled condenser 92, the heat fluxed liquid exits from the fourth exit mouth 92b of the second coil tube 92B (as illustrated by solid line arrows).

According to aspects of the present disclosure, the heat fluxed liquid is received at the feed reactor 61 via the first channel tube 91d. As can be seen in FIG. 1, the heat fluxed liquid is received into the feed reactor 61 through the intake port 90d of the parabolic arm air cooled dome condenser 90 (as illustrated by solid line arrows). The heat fluxed liquid is also received at the feed reactor 61 via the fourth channel tube 92C (as illustrated by solid line arrows).

According to an aspect of the present disclosure, after the heat exchange process, the heat fluxed liquid is used as the feed to be distilled for the feed reactor 61 to the adjusted flow rate and rest of the heat fluxed liquid flows back to the fourth air/water condenser 95 via the second channel tube 91e and a second fluid coupling line 122 (as illustrated by double arrows). As can be seen in FIG. 1, a connector 91g connects the second channel tube 91e with the second fluid coupling line 122. The fourth air/water condenser 95 is configured to cool the heated liquid or bring the temperature of the heated liquid equal to or lower than the predetermined threshold temperature. The cooled liquid flows back to the reserve water reservoir 97 from the fourth air/water condenser 95 via the fourth channel tube 92C (as illustrated by double arrows). The heated liquid is hereinafter referred to as feed liquid.

According to aspects of the present disclosure, the magnetron generator 60 is configured to generate electromagnetic microwave radiations. The magnetron generator 60 is operatively electrically connected to receive power from at least one of the photovoltaic panel 151 and the utility grid 201. In an aspect, the transformer 63 may receive power from the photovoltaic panel 151 for the magnetron generator 60 and the exhaust fan 53. According to an aspect of the present disclosure, the dedicated duct 51a of the multimode cavity 51 is configured to provide the microwave radiations generated by magnetron generator 60 into the multimode cavity 51. Further, as described earlier, the walls of the feed reactor 61 are made of electromagnetic wave absorbent material. Thus, the electromagnetic microwave radiations generated by the magnetron generator 60 are transmitted into the feed reactor 61 through the walls.

During the water treatment process or liquid distillation process, the stirring motor 81 is configured to continuously turn the neodymium magnetic blade 85. The stirring motor 81 is operatively electrically connected at least one of the wind power turbine 160 and the photovoltaic panel 151. Accordingly, the feed liquid in the feed reactor 61 is continuously stirred while the feed liquid is being heated by the microwave radiations. As may be understood, when the feed liquid is continuously stirred, interaction between the feed liquid and electromagnetic microwave radiations is increased, and absorption of the electromagnetic microwave radiations by the feed liquid maximizes. As a result, the heated liquid inside the feed reactor 61 is converted into vapor, hereinafter referred to hot distilled vapor. In an example, the feed liquid in the feed reactor 61 is heated for a predefined period of time.

According to an aspect of the present disclosure, the temperature of the feed liquid is continuously controlled by the temperature controller 70b. For example, the temperature controller 70b is configured to control the temperature of the feed liquid in the feed reactor 61 by switching the magnetron generator 60 on and off. In some aspects of the present disclosure, the temperature controller 70b is configured to control the power of the magnetron generator 60 within the adjusted temperature of the feed liquid and to retain the feed liquid temperature difference at a range of about 0.1° C. to about 0.5° C., and preferably to about 0.5° C. Further, in some aspects of the present disclosure, the temperature controller 70b is configured to control power of the magnetron generator 60 at any level of feed liquid temperature.

The opening mouth tail 90a of the parabolic arm air cooled dome condenser 90 is configured to collect the hot distilled vapors from the feed reactor 61. Further, the hot distilled vapors are scattered inside the parabolic arm air cooled dome condenser 90. According to an aspect of the present disclosure, the hot distilled vapors move forward towards the upper mouth opening 90b and the gravity vacuum funnel 90c within parabolic arm air cooled dome condenser 90. According to aspects of the present disclosure, due to freshwater vapors pressure, the hot distilled vapors move forward towards the at upper mouth opening 90b and the gravity vacuum funnel 90c of the parabolic arm air cooled dome condenser 90.

In an example, the hot distilled vapors may include lower level hot distilled vapors and upper level hot distilled vapors. The lower level hot distilled vapors may refer to vapors that have low temperature, and the upper level hot distilled vapors may refer to vapors that have high temperature. As may be understood, the upper level hot distilled vapors may move higher than the lower level hot distilled vapors.

In an aspect, the gravity vacuum funnel 90c may receive the lower level hot distilled vapors and the upper mouth opening 90b may receive the upper level hot distilled vapors. Further, the first entrance mouth 91h of the third air/water-cooled condenser 91 receives the upper level hot distilled vapors from the upper mouth opening 90b of parabolic arm air cooled dome condenser 90. Also, the second receiving mouth 92d of the first air/water-cooled condenser 92 is configured to receive the lower level hot distilled vapors from the gravity vacuum funnel 90c of the parabolic arm air cooled dome condenser 90.

On receiving the upper level hot distilled vapors, the third air/water-cooled condenser 91 condenses the upper level hot distilled vapors and outputs a fluid stream of fresh water, and on receiving the lower level hot distilled vapors, the first air/water-cooled condenser 92 condenses the lower level hot distilled vapors and outputs a fluid stream of fresh water. According to aspects of the present disclosure, the first air/water cooled condenser 92 also receives the fluid stream of fresh water from the third air/water cooled condenser 91 via the first receiving mouth 92g. As can be seen in FIG. 1, the second exit mouth 91i of the third air/water cooled condenser 91 outputs the fluid stream of fresh water into the first air/water cooled condenser 92. The first air/water-cooled condenser 92 then outputs the fluid stream of fresh water into the gravity vacuum funnel 93 via the fifth exit mouth 92e. The fluid stream of fresh water then flows from the gravity vacuum funnel 93 into the fresh water storage unit 100 (as illustrated by dotted line arrows).

The fresh water storage unit 100 includes the one or more layers of activated carbon 103 and the natural zeolite layer 104 beneath the one or more layers of activated carbon 103. The one or more layers of activated carbon 103 and the natural zeolite layer 104 are configured to filter the fresh water entering the fresh water storage unit 100. In an example, the function of the one or more layers of activated carbon 103 is to remove odor (such as gas odor) from the fresh water and the function of the natural zeolite layer 104 is to add minerals in the fresh water. Further, fresh water storage unit 100 includes the first channel 102 configured to create air vacuum inside the fresh water storage unit 100.

Further, the pulsed electromagnetic irradiation system 10 includes a computing system 20. The computing system 20 is connected to the hydraulic temperature control system 70. In an example, the computing system 20 may control and monitor the functioning of the hydraulic temperature control system 70. Although, it has been shown that the computing system 20 is connected to the hydraulic temperature control system 70, in some aspects of the present disclosure, the computing system 20 may also be connected to other components of the pulsed electromagnetic irradiation system 10.

According to aspects of the present disclosure, the pulsed electromagnetic irradiation system 10 may carry out electromagnetic irradiation assisted desalination process under the appropriate conditions. It is one of the objectives of the pulsed electromagnetic irradiation system 10 to generate high dispersion of microwave radiations, which increases the area that can cause effective heating of the liquid inside the feed reactor 61. As a result, the multimode cavity 51 can accommodate several samples simultaneously for heating. Further, the pulsed electromagnetic irradiation system 10 is a complete distillation setup wherein a proper seal or connection is maintained between various component of the pulsed electromagnetic irradiation system 10.

The pulsed electromagnetic irradiation system 10 can perform the water desalination at required temperatures, and at a pressure of ~4 bar. The neodymium magnetic blade 85 and the coated neodymium magnetic plate 81b made of high-intensity permanent magnet plates coupled with the stirring motor 81 are configured to provide perpetual stirring (~100-2000 rpm) due to glass or ceramic ball bearing magnetic propeller. To overcome the hindrance of dielectric loss and gain optimum volume of saline water during the desalination process, the heat penetration depth may be optimized, and optimum level of electromagnetic radiations are absorbed.

The pulsed electromagnetic irradiation system 10 is an enclosed system. Thus, the feed liquid temperature can be raised to its boiling points and the vapors are generated as a result of boiling of the feed liquid. Due to the enclosed system, the loss of freshwater vapors is negligible during the water distillation process. Further, the preheated liquid is supplied continuously from the reserve water reservoir 97 at a constant rate. The constant feed flow rate is proportional to the distilled water permeation rate. The pulsed electromagnetic irradiation system 10 reduces a boiling time to about 70%-80% compared to with the conventional distillation systems due to the pulsed control irradiation with respect to liquid volume and continuously heated raw water as feed (70-80° C.). In an aspect of the present disclosure, the magnetron generator 60 consumes energy at 8 seconds per minute for 1-gallon water. According to aspects of the present disclosure, the pulsed electromagnetic irradiation system 10 consumes energy of about 70% less than the conventional distillation systems.

Figure 2:
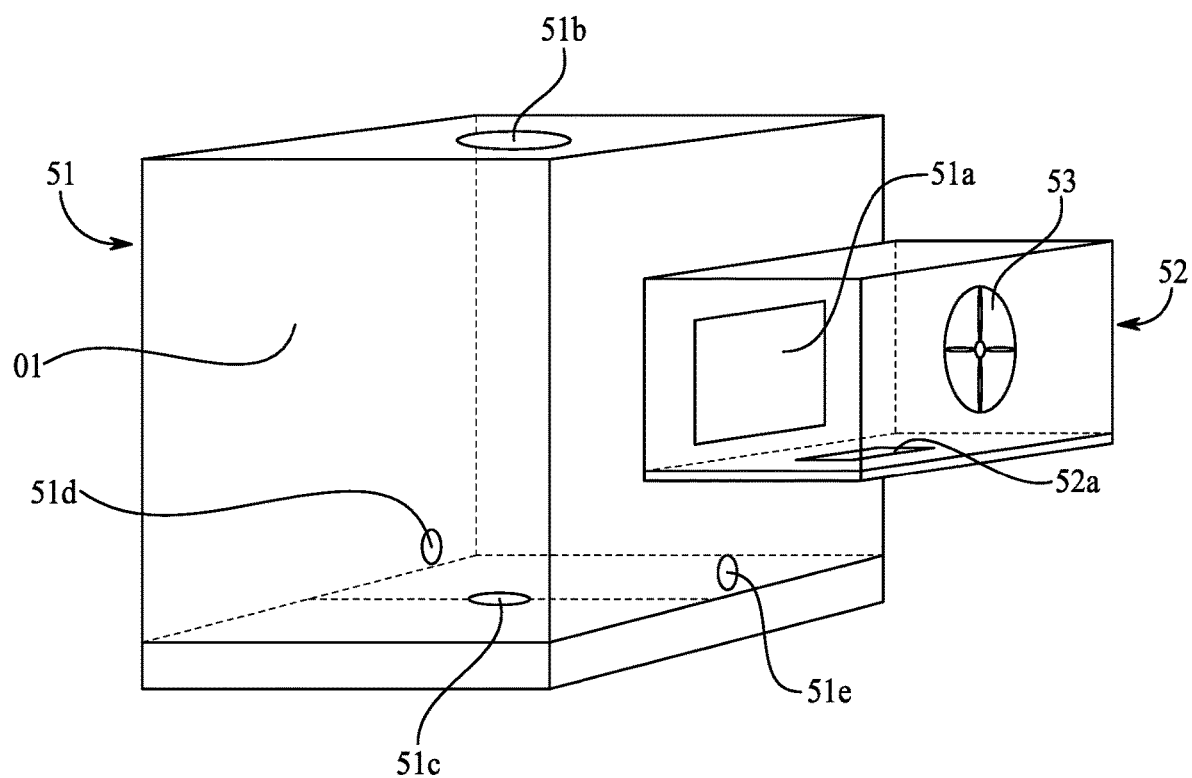
FIG. 2 is a schematic diagram of a multimode cavity of the pulsed magnetic irradiation system, according to exemplary aspects of the present disclosure.

FIG. 2 is a schematic diagram of the multimode cavity 51 of the pulsed magnetic irradiation system 10, according to exemplary aspects of the present disclosure.

According to aspects of the present disclosure, the multimode cavity 51 is configured to house the feed reactor 61. The multimode cavity 51 is a custom-made chamber that allows for rapid heating of liquid within the feed reactor 61. Further, the multimode cavity 51 includes a transparent surface. The multimode cavity 51 includes one of an external coating of silver on the transparent surface or an external coating of aluminum on the transparent surface. The multimode cavity 51 further includes an access door 01. In an example, the access door 01 may be made of glass or any other suitable material.

The multimode cavity 51 includes a plurality of side walls, as well as an upper wall and a bottom wall. Further, the upper wall of the multimode cavity 51 includes the first opening void 51b. The bottom wall of the multimode cavity 51 includes the second opening void 51c. One of the side walls of the multimode cavity 51 includes the third opening void 51d and other side wall of the multimode cavity 51 includes the fourth opening void 51e. In an example, a size of the first opening void 51b may be greater than 6 cm, a size of the second opening void 51c may be less than 1 cm, and a size of the third opening void 51d may be less than 0.5 cm. The multimode cavity 51 further includes a dedicated duct 51a located at the side wall at which the fourth opening void 51e is located.

According to aspects of the present disclosure, the first opening void 51b of the multimode cavity 51 provides access for the lid 62 of the feed reactor 61. Further, the motor shaft 81a is placed within the multimode cavity 51 via the fourth opening void 51c. The third opening void 51d provides access to the second channel 61b for the brine or concentrate discharge, and the fourth opening void 51e provides access to the hydraulic temperature control system 70 inside the multimode cavity 51.

The multimode cavity 51 further includes the magnetron chamber 52. The magnetron chamber 52 is attached to the side wall of the multimode cavity 51 through dedicated duct 51a. As can be seen in FIG. 2, the magnetron chamber 52 is attached above the fourth opening void 51e. According to an aspect of the present disclosure, the magnetron chamber 52 may house the magnetron generator 60. The magnetron generator 60 is configured to produce electromagnetic microwave radiations within the magnetron chamber 52. The dedicated duct 51a is configured to allow electromagnetic microwave radiations generated by the magnetron generator 60 into the multimode cavity 51.

The magnetron chamber 52 includes the exhaust fan 53 located at a side wall of the magnetron chamber 52. The exhaust fan 53 is provided for cooling the magnetron generator 60. The magnetron chamber 52 also includes the mesh 52a located at a bottom wall of the magnetron chamber 52 for receiving cool air.

FIG. 3A is a schematic diagram of the feed reactor 61 of the pulsed magnetic irradiation system 10, according to exemplary aspects of the present disclosure and FIG. 3B is a schematic diagram of the lid 62 for the feed reactor 61, according to exemplary aspects of the present disclosure.

According to aspects of the present disclosure, the feed reactor 61 is configured to receive and hold liquid that is to be distilled. In an example, the feed reactor 61 has a wide neck for receiving the liquid. Further, the feed reactor 61 may be made of one of glass, ceramic, or polypropylene. In an example, the feed reactor 61 can hold predetermined volume amount of liquid.

In an aspect of the present disclosure, the feed reactor 61 has an opening 61c to adapt the lid 62. Further, the feed reactor 61 includes the brine outlet 61a and the second channel 61b at the bottom to discharge brine or concentrate. In an example, the feed reactor 61 may continuously discharge the brine or concentrate through the brine outlet 61a into the second channel 61b. The feed reactor 61 further includes the neodymium magnetic blade 85 for liquid rotation. In an example, the neodymium magnetic blade 85 is a magnetic stirrer. According to an aspect of the present disclosure, the neodymium magnetic blade 85 can stir the liquid within the feed reactor 61 to maintain a constant temperature of the liquid within the feed reactor 61. Also, the neodymium magnetic blade 85 allows for even and rapid heating of the liquid within the feed reactor 61. In an example, by continuously stirring the liquid within the feed reactor 61, dielectric loss is controlled and the heating efficiency of the liquid within the multimode cavity 51 is optimized.

Further, the feed reactor 61 includes four first attachment means 61d. In an example, each of the first attachment means 61d may be a clamp or any other type of attachment means for attachment of the lid 62 onto the opening 61c of the feed reactor 61. Although, it has been shown that the feed reactor 61 includes four first attachment means 61d, in some aspects of the present disclosure, the feed reactor 61 may include more or less than four first attachment means 61d, as desired.

The feed reactor 61 also includes a sealing ring 61e configured to seal the feed reactor 61 with the lid 62 in order to prevent hot distilled vapors from escaping from between the lid 62 and the feed reactor 61 once the liquid inside the feed reactor 61 gets heated up or boils. In other words, the feed reactor 61 is concealed with the lid 62 within the multimode cavity 51 for the liquid to heat up inside the multimode cavity 51. In an example, the sealing ring 61e may be a gasket.

Referring now to FIG. 3B, the lid 62 includes the neck lid 62a for receiving the liquid and ratifying hot vapors that are generated as a result of heating up of the liquid. The lid 62 further includes the neck head 62b. Further, the lid 62 includes four second attachment means 62c. In an example, each of the second attachment means 62c may be a clamp or any other type of attachment means for attachment of the lid 62 onto the opening 61c of the feed reactor 61.

Although, it has been shown that the lid 62 includes four second attachment means 62c, in some aspects of the present disclosure, the lid 62 may include more or less than four second attachment means 62c, as desired.

Figure 4:
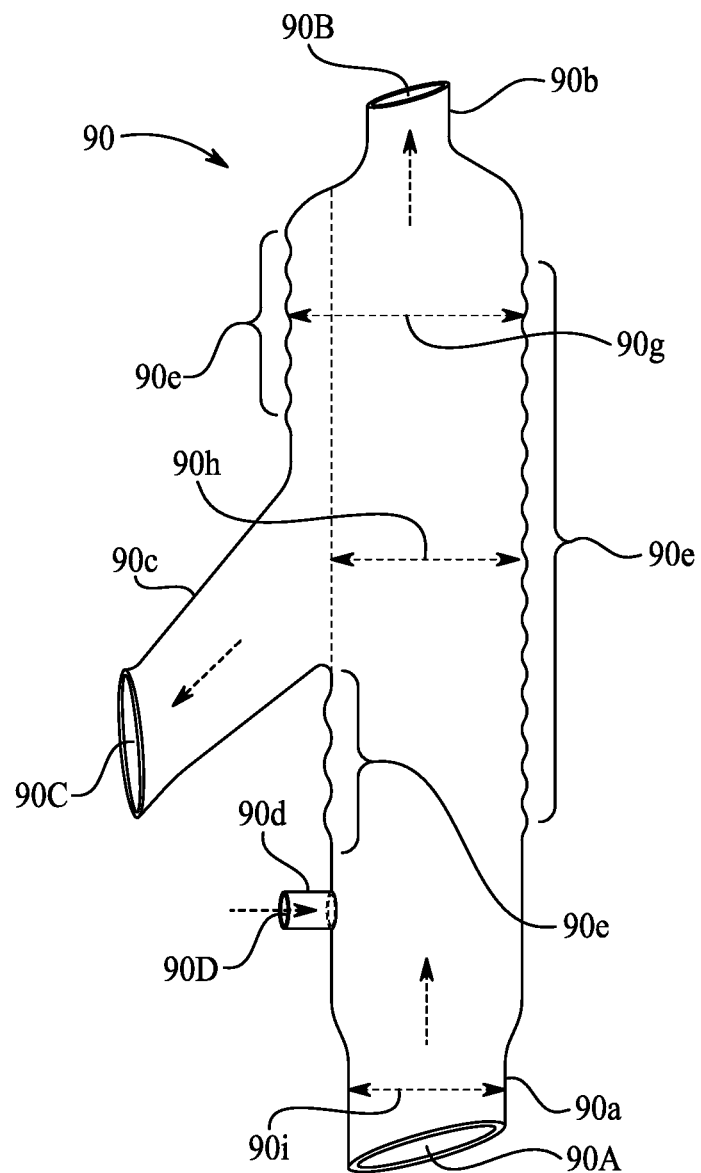
FIG. 4 is a schematic diagram of a parabolic arm air cooled dome condenser of the pulsed magnetic irradiation system, according to exemplary aspects of the present disclosure.

FIG. 4 is a schematic diagram of the parabolic arm air cooled dome condenser 90 of the pulsed magnetic irradiation system 10, according to exemplary aspects of the present disclosure.

According to aspects of the present disclosure, the parabolic arm air cooled dome condenser 90 is made of one of glass, ceramic, or polypropylene. As can be seen in FIG. 4, the parabolic arm air cooled dome condenser 90 has waveform walls 90e configured to provide an increased surface area for heat release from a surface of the parabolic arm air cooled dome condenser 90. Further, the parabolic arm air cooled dome condenser 90 includes the opening mouth tail 90a. Further, the opening mouth tail 90a has the first intake mouth 90A. The opening mouth tail 90a is configured to collect hot distilled vapors or hot distilled vapor fumes from the feed reactor 61 via the first intake mouth 90A.

Further, the parabolic arm air cooled dome condenser 90 has three opening mouths namely, the upper mouth opening 90b, the gravity vacuum funnel 90c, and the intake port 90d. Further, the upper mouth opening 90b has a fourth exit mouth 90B, the gravity vacuum funnel 90c has a sixth exit mouth 90C and the intake port 90d has a second intake mouth 90D. The second intake mouth 90D of the intake port 90d is configured to receive the heated liquid from the first air/water cooled condenser 92 and the third air/water cooled condenser 91. Further, as shown in FIG. 4, a width namely an upper width 90g of an upper part of the parabolic arm air cooled dome condenser 90 is greater than a width namely a middle width 90h of a middle part of the parabolic arm air cooled dome condenser 90 and a width namely a lower width 90i of a lower part of the parabolic arm air cooled dome condenser 90. Also, the middle width 90h of the middle part of the parabolic arm air cooled dome condenser 90 is larger than the lower width 90i of the lower part of the parabolic arm air cooled dome condenser 90.

The upper mouth opening 90b and the gravity vacuum funnel 90c are configured to receive hot distilled vapors from the feed reactor 61. In an example, due to fresh water vapors pressure, the hot distilled vapors move towards the upper mouth opening 90b and the gravity vacuum funnel 90c. According to an aspect of the present disclosure, the gravity vacuum funnel 90c is configured to receive the lower level hot distilled vapors and the upper mouth opening 90b is configured to receive the upper level hot distilled vapors. Further, the sixth exit mouth 90C of the gravity vacuum funnel 90c is configured to output the lower level hot distilled vapors into the first air/water cooled condenser 92 and the fourth exit mouth 90B of the upper mouth opening 90b is configured to output the upper level hot distilled vapors into the third air/water cooled condenser 91.

Figure 5:
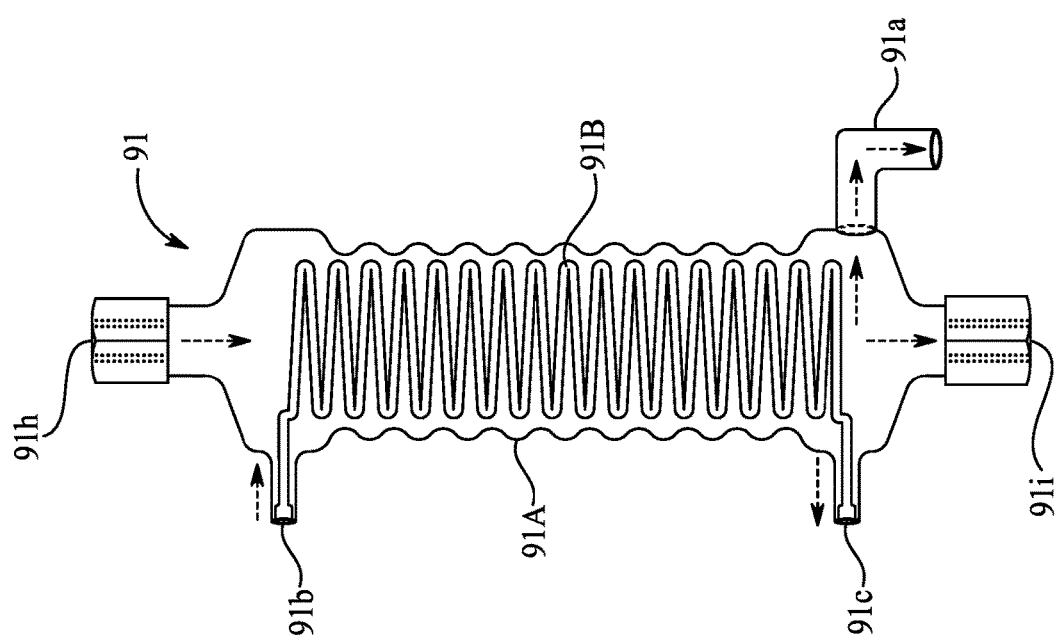
FIG. 5 is a schematic diagram of a second air/water cooled condenser of the pulsed magnetic irradiation system, according to exemplary aspects of the present disclosure.

FIG. 5 is a schematic diagram of the third air/water cooled condenser 91 of the pulsed magnetic irradiation system 10, according to exemplary aspects of the present disclosure.

The third air/water-cooled condenser 91 has the first shell wall 91A and the first coil tube 91B. In an example, the first shell wall 91A has a waveform shape. Further, the third air/water cooled condenser 91 includes the condenser coil tube entrance mouth 91b, the first exit mouth 91c, the first entrance mouth 91h, and the second exit mouth 91i. The third air/water cooled condenser 91 also includes the third exit mouth 91j. As can be seen in FIG. 5, the third exit mouth 91j is connected to the third channel 91a. According to aspects of the present disclosure, the condenser coil tube entrance mouth 91b is configured to receive the cooled liquid from the second air/water cooled condenser 94. The third air/water-cooled condenser 91 performs the heat exchange process on the received cooled liquid and outputs the heated liquid. The heated liquid exits from the first exit mouth 91c of the first coil tube 91B and the heated liquid is used as a feed to the feed reactor 61.

According to aspects of the present disclosure, the first entrance mouth 91h receives the upper level hot distilled vapors from the parabolic arm air cooled dome condenser 90. Further, as described earlier, on receiving the upper level hot distilled vapors, the third air/water-cooled condenser 91 condenses the upper level hot distilled vapor and generates the fluid stream of cooled fresh water. The fluid stream of cooled fresh water may exit from the second exit mouth 91*i* or from the third exit mouth 91*j* of the third channel 91*a*.

Figure 6:
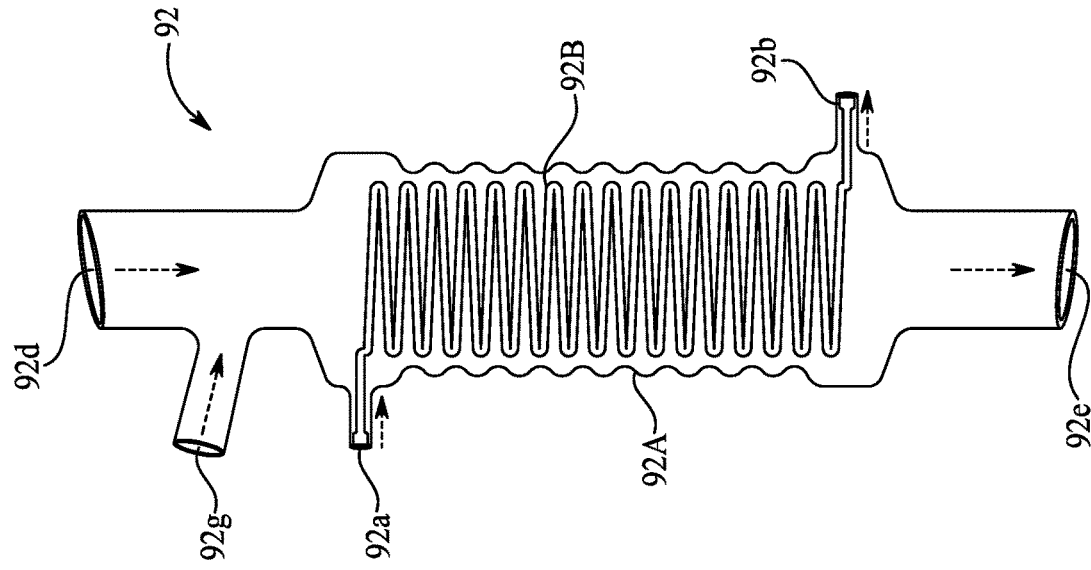
FIG. 6 is a schematic diagram of a first air/water cooled condenser of the pulsed magnetic irradiation system, according to exemplary aspects of the present disclosure.

FIG. 6 is a schematic diagram of the first air/water cooled condenser 92 of the pulsed magnetic irradiation system 10, according to exemplary aspects of the present disclosure.

The first air/water-cooled condenser 92 has the second shell wall 92A and the second coil tube 92B. In an example, the second shell wall 92A has a waveform shape. Further, the first air/water cooled condenser 92 includes the first receiving mouth 92*g*, the second receiving mouth 92*d*, the second entrance mouth 92*a*, the fourth exit mouth 92*b*, and the fifth exit mouth 92*e*.

According to aspects of the present disclosure, the second entrance mouth 92*a* of the first air/water cooled condenser 92 is configured to receive the cooled liquid from the second air/water cooled condenser 94. On receiving the cooled liquid from the second air/water cooled condenser 94, the first air/water-cooled condenser 92 performs the heat exchange process on the received cooled liquid and outputs the heated liquid. The heated liquid exits from the fourth exit mouth 92*b* and the heated liquid is used as a feed to the feed reactor 61. Further, the second receiving mouth 92*d* is configured to receive the lower level hot distilled vapors from the parabolic arm air cooled dome condenser 90. On receiving the lower level hot distilled vapors, the first air/water-cooled condenser 92 condenses the lower-level hot distilled vapors to generate the fluid stream of cooled fresh water. The fluid stream of cooled fresh water flows out of the first air/water-cooled condenser 92 via the fifth exit mouth 92*e*. Further, the first receiving mouth 92*g* is configured to receive the condensed liquid (i.e., the fluid stream of cooled fresh water) from the third air/water cooled condenser 92.

Figure 7:
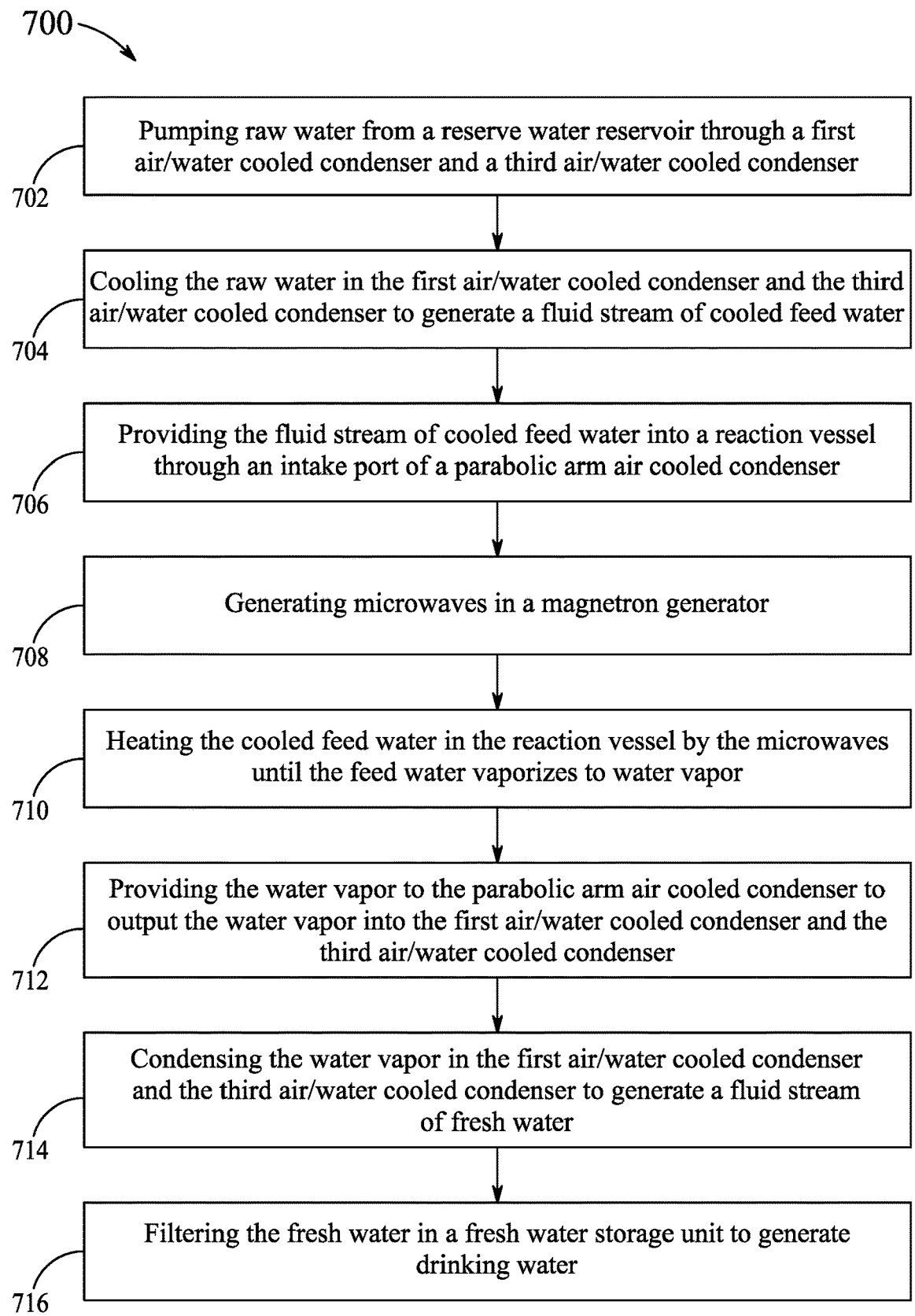
FIG. 7 illustrates a flowchart of a pulsed electromagnetic irradiation method for water treatment, according to exemplary aspects of the present disclosure.

FIG. 7 illustrates a flowchart of a pulsed electromagnetic irradiation method 700 for water treatment, according to exemplary aspects of the present disclosure.

At step 702, the pulsed electromagnetic irradiation method 700 includes pumping raw water from the reserve water reservoir 107 through the first air/water cooled condenser 92 and the third air/water cooled condenser 91. According to aspects of the present disclosure, the raw water is pumped into the first air/water cooled condenser 92 and the third air/water cooled condenser 91 through the second air/water cooled condenser 94.

At step 704, the pulsed electromagnetic irradiation method 700 includes cooling the raw water in the first air/water cooled condenser 92 and the third air/water cooled condenser 91 to generate a fluid stream of cooled feed water.

At step 706, the pulsed electromagnetic irradiation method 700 includes providing the fluid stream of cooled feed water into the feed reactor 61 via the intake port 90*d* of the parabolic arm air cooled dome condenser 90.

At step 708, the pulsed electromagnetic irradiation method 700 includes generating microwaves in the magnetron generator 60. According to aspects of the present disclosure, the magnetron generator 60 is operatively electrically connected to receive power from at least one of the photovoltaic panel 151 and the utility grid 201. On receiving the power, the magnetron generator 60 generates electromagnetic microwave radiations.

At step 710, the pulsed electromagnetic irradiation method 700 includes heating the cooled feed water in the feed reactor 61 by the microwaves until the feed water vaporizes to water vapor. According to aspects of the present disclosure, the feed reactor 61 receives the microwaves generated by magnetron generator 60 and then the cooled feed water contained in the feed reactor 61 vaporizes to water vapor. In an aspect of the present disclosure, the magnetron generator 60 is configured to generate microwaves to heat the raw water in the feed reactor 61 and convert the raw water to water vapor. Further, the feed water in the feed reactor 61 is continuously stirred by the stirring motor 81 while heating by the microwaves. Also, the temperature of the feed water in the feed reactor 61 is controlled by switching the magnetron generator 60 on and off by the temperature controller 70*b*.

At step 712, the pulsed electromagnetic irradiation method 700 includes providing the water vapor to the parabolic arm air cooled dome condenser 90 to output the water vapor into the first air/water cooled condenser 92 and the third air/water cooled condenser 91.

At step 714, the pulsed electromagnetic irradiation method 700 includes condensing the water vapor in the first air/water cooled condenser 92 and the third air/water cooled condenser 91 to generate a fluid stream of fresh water. According to aspects of the present disclosure, the first air/water cooled condenser 92 and the third air/water cooled condenser 91 receive the water vapors from the parabolic arm air cooled dome condenser 90 and condense the water vapors to generate the fluid stream of fresh water.

At step 716, the pulsed electromagnetic irradiation method 700 includes filtering the fresh water in the fresh water storage unit 100 to generate drinking water. According to aspects of the present disclosure, the first air/water cooled condenser 92 and the third air/water cooled condenser 91 output the fluid stream of fresh water into the fresh water storage unit 100. The fluid stream of fresh water is filtered in the fresh water storage unit 100, producing drinking water.

The first embodiment is illustrated with respect to FIGS. 1-8. The first embodiment describes a pulsed electromagnetic irradiation system for water treatment. The pulsed electromagnetic irradiation system includes a raw water supply unit, where the raw water supply unit is in fluid communication with a reaction vessel through a water pump; a multimode cavity, where the reaction vessel is partially positioned into the multimode cavity; a magnetron generator, where the magnetron generator is laterally and angularly positioned adjacent the multimode cavity, where the magnetron generator is electromagnetically coupled with a liquid within the reaction vessel; a stirring motor, where the stirring motor is positioned adjacent a bottom surface of the multimode cavity, where the stirring motor is operatively coupled with the reaction vessel to stir the liquid within the reaction vessel; a parabolic arm air cooled condenser, where the parabolic arm air cooled condenser is terminally connected to the reaction vessel to be in fluid communication with the reaction vessel; and a gravity vacuum funnel, wherein the gravity vacuum funnel is in communication with a first air/water cooled condenser to transfer water vapor output of the parabolic arm air cooled condenser to the first air/water cooled condenser, and wherein the first air/water cooled condenser outputs a fresh water stream to a fresh water storage unit.

The pulsed electromagnetic irradiation system for water treatment of claim further comprises a hydraulic temperature control system. The hydraulic temperature control system comprises a first section and a second section. The first section being positioned within the multimode cavity, and the second section being positioned along an outer wall of the multimode cavity.

The water pump and the stirring motor are operatively electrically connected to a renewable energy source, the renewable energy source includes at least one of a wind power turbine and a photovoltaic panel; and the magnetron generator is operatively electrically connected to receive power from at least one of the photovoltaic panel and a utility grid.

The liquid within the reaction vessel is at least one of seawater, brackish water, and wastewater.

The pulsed electromagnetic irradiation system for water treatment further comprises one of: an external coating of silver on a transparent surface of the multimode cavity; and an external coating of aluminum on a transparent surface of the multimode cavity.

The pulsed electromagnetic irradiation system for water treatment further comprises a second air/water cooled condenser in fluid communication with the water pump; and a third air/water cooled condenser in fluid communication with the second air/water cooled condenser and an intake port of the parabolic arm air cooled condenser.

The pulsed electromagnetic irradiation system for water treatment further comprises a first thermocouple and a first flow meter connected between the water pump and the second air/water cooled condenser; a second thermocouple, a first pressure gauge, a second flow meter and a first conductivity meter connected between the second air/water cooled condenser and the third air/water cooled condenser; and a third thermocouple and a third flow meter connected between the third air/water cooled condenser and the intake port of the parabolic arm air cooled condenser.

The pulsed electromagnetic irradiation system for water treatment further comprises a plurality of fluid coupling lines configured to provide hermetically sealed fluid connection between the water pump and the second air/water cooled condenser, the second air/water cooled condenser and the third air/water cooled condenser, the third air/water cooled condenser and the intake port of the parabolic arm air cooled condenser, an upper mouth opening of the parabolic arm air cooled condenser and the first air/water cooled condenser, the first air/water cooled condenser and the fresh water storage unit, the first air/water cooled condenser and a fourth air/water cooled condenser, the fourth air/water cooled condenser and a reverse water reservoir; and a plurality of sensors, each sensor including at least one of a thermocouple, a flow meter, a conductivity meter and a pressure gauge, wherein each fluid coupling line includes at least one sensor.

The pulsed electromagnetic irradiation system for water treatment further comprises a plurality of water valves configured to control the fluid communication in the fluid coupling lines.

The fresh water storage unit includes a plurality of layers of activated carbon and a natural zeolite layer beneath the plurality of layers of activated carbon, wherein a plurality of layers of activated carbon and natural zeolite layer are configured to filter the fresh water entering the fresh water storage unit.

The stirring motor includes a motor shaft and a neodymium magnetic blade; and a coated neodymium magnetic plate is operatively attached to the motor shaft to rotate the neodymium magnetic blade.

The stirring motor is configured to continuously turn the neodymium magnetic blade during the water treatment.

An outer surface of the parabolic arm air cooled condenser has waveform walls configured to provide an increased surface area for heat release from a condenser surface.

The pulsed electromagnetic irradiation system for water treatment further comprises a brine outlet at the bottom of the reaction vessel.

The pulsed electromagnetic irradiation system for water treatment further comprises a temperature sensor operatively connected to the brine outlet, the temperature sensor configured to gauge a temperature of the brine; a transformer operatively connected to provide power from the power supply to the magnetron generator; and a temperature controller located between the transformer and the power supply, the temperature controller operatively connected to switch power to the magnetron generator on and off based on the temperature of the brine.

The reaction vessel and parabolic arm air cooled condenser are each made of one of glass, ceramic, or, polypropylene.

The reaction vessel has multi-mode inner cavity walls configured to reflect microwaves generated by the magnetron generator to prevent radiation leakage and increase the heating efficiency.

The second embodiment is illustrated with respect to FIGS. 1-8. The second embodiment describes a pulsed electromagnetic irradiation method for water treatment. The pulsed electromagnetic irradiation method includes pumping raw water from a reserve water reservoir through a first air/water cooled condenser and a third air/water cooled condenser; cooling the raw water in the first air/water cooled condenser and the third air/water cooled condenser to generate a fluid stream of cooled feed water; providing the fluid stream of cooled feed water into a reaction vessel through an intake port of a parabolic arm air cooled condenser; generating microwaves in a magnetron generator; heating the cooled feed water in the reaction vessel by the microwaves until the feed water vaporizes to water vapor; providing the water vapor to the parabolic arm air cooled condenser to output the water vapor into the first air/water cooled condenser and the third air/water cooled condenser; condensing the water vapor in the first air/water cooled condenser and the third air/water cooled condenser to generate a fluid stream of fresh water; and filtering the fresh water in a fresh water storage unit to generate drinking water.

The pulsed electromagnetic irradiation method for water treatment further comprises continuously stirring the feed water in the reaction vessel while heating by the microwaves.

The pulsed electromagnetic irradiation method for water treatment further comprises controlling a temperature of the feed water in the reaction vessel by switching the magnetron generator on and off by a temperature controller.

The third embodiment is illustrated with respect to FIGS. 1-8. The third embodiment describes a pulsed electromagnetic irradiation system for water treatment. The pulsed electromagnetic irradiation system for water treatment includes a raw water supply unit; a water pump configured to pump-raw water to a reaction vessel; a multimode cavity surrounding the reaction vessel; a magnetron generator laterally and angularly positioned adjacent the multimode cavity, where the magnetron generator is configured to generate microwaves to heat the raw water in the reaction vessel and convert the raw water to water vapor; a stirring motor positioned adjacent a bottom surface of the multimode cavity, where the stirring motor is configured to stir the raw water within the reaction vessel; a parabolic arm air cooled condenser terminally connected to the reaction vessel, the parabolic arm air cooled condenser configured to provide the water vapor to the first air/water cooled condenser and the third air/water cooled condenser; and the first air/water cooled condenser and the third air/water cooled condenser configured to condense the water vapor generate a water output and transfer the water output to a fresh water storage unit.

Thermodynamic Basis of the Pulsed Electromagnetic Irradiation System 10

The thermodynamic equation of power measurement in the pulsed electromagnetic irradiation system 10 is derived from the elementary theory of heat capacity of given mass at atmospheric pressure.

$$P_{absorbed} = P_{power} = KC_P m \times \frac{\Delta T}{t} \tag{1}$$

where, $\Delta T$ represents temperature difference $(T_f-T_0)$. The one-dimensional unsteady state heat conduction equation with heat generation may be used to describe microwave heating of material.

$$\rho_{mix} C_{p,mix} \frac{\partial T}{\partial t} = \frac{\partial}{\partial y}\left(\sigma_{mix} \frac{\partial T}{\partial y}\right) + P_{absorbed} \tag{2}$$

where, $\rho_{mix}$ represents bulk density of the solution (gm·cm$^{-3}$), $C_{p,mix}$ represents the specific heat capacity of mixture of material (cal·g$^{-1}$·°C.$^{-1}$), $$\frac{\partial T}{\partial t}$$

represents the rise of temperature due to microwave radiation (°C.sec$^{-1}$), $\sigma_{mix}$ represents the thermal conductivity of the mixture of material (cal·cm$^{-1}$·°C.$^{-1}$), and y represents the location of sample.

Equation (2) includes three terms: convective heat transfer, radiative heat due to electromagnetic waves and conductive heat in the sample. From results of the experimental data, the effect of radiative heat due to electromagnetic waves and the convective heat transfer is minimal. Since the feed reactor 61 has low dielectric constant, heat generated $q_{EW}$ (cal/sec·cm$^3$) by the reaction vessel is assumed to be negligible. Therefore, the volume rate of heat generation with respect to rate of temperature rise (°C.sec$^{-1}$) is be given by equation (3).

$$\frac{dT}{dt} = \frac{q_{EW}}{\rho_{mix} C_{p,mix}} \tag{3}$$

where, $\rho_{mix}$ represents density of solution or mixture (i.e., raw water), $C_{p,mix}$ represents heat capacity of solution, dT represents temperature difference $(T_f-T_{initial})$ and $d_t$ represents time difference. Since $q_{EW}$ is a constant depending on the k=0 electric field and mobility of the materials at fixed location for calculation of the volume rate of heat generation, the specific heat capacity and dielectric constant of the solid and liquid materials are calculated by mixing rules as described in equation (4):

$$Z^k = V_{mix} Z_{mix}^k + V_s Z_{mix}^k; -1 \le k \le 1 \tag{4}$$

where, k represents a numerical variable. When k=−1, the formula for mixing in series is obtained and when k=1, the formula for parallel mixing is obtained. When k=0 the logarithmic term is expanded in infinite series and the higher order terms are neglected. A logarithmic of dielectric constant and heat capacity of the mixture of materials is given by equation (5):

$$\log Z = V_{salts} \log Z_{salts} + V_{solvent} \log Z_{mix} \tag{5}$$

where Z represents the dielectric constant ($\varepsilon$) and heat capacity ($C_p$) of the mixture of materials, V represents the volume fraction, and the subscript p of heat capacity ($C_p$) represents salts or solutes in the liquid. Further, $Z_{mix}$ can be calculated by 2$^{nd}$ order polynomial or linear equation.

Since Looyenga's formula has been proved to be applicable for polar solvent mixtures, equation (6) is also applicable for salts ions in the mixture of solution.

$$Y_{s,m} = [Z_{S1} + V_{S2}(Z_{S1}^{1/3} + Z_{S1}^{1/3})]^3 \tag{6}$$

The dielectric loss $\varepsilon''$ or tangent loss (tan $\delta_{mix,salts}$) of the mixture of materials can be calculated by following equation (7).

$$\tan \delta_{s,m} = \frac{\phi_{S,1} \varepsilon'_{S,2} \tan \delta_{S,1} + \phi_{S,2} \varepsilon'_{S,1} \tan \delta_{S,2}}{\phi_{S,1} \varepsilon'_{S,2} + \phi_{S,2} \varepsilon'_{S,1}} \tag{7}$$

The dissipation factor or dielectric loss tan $\delta_{mix,salts}$ for the salt-solvent may be approximated as:

$$\tan \delta_{m,p} = \frac{\varphi_P \varepsilon'_{mix} \tan \delta_P}{\varphi_P \varepsilon'_{mix} + \varphi_{mix} \varepsilon'_P} \tag{8}$$

$$\tan \delta_{mix,salts} = \frac{\phi_{Salts} \varepsilon'_{mix} \tan \delta_{Salts}}{\phi_{salts} \varepsilon'_{mix} + \phi_{mix} \varepsilon'_{salts}} \tag{9}$$

For most of the materials, weight is measured in grams. Accordingly, it becomes necessary to convert between the weight fraction (w) to volume fraction (V) of the components in dealing with multicomponent material, which can be salts or solutes which are monovalent, divalent or trivalent. The equation (10) provided below may be used to make this conversion, $$K_f \cdot \phi_{salts} = V_n = \left(\frac{w_i}{\rho_i}\right) \times \Sigma_{j=1}^n \frac{\rho_j}{w_j} \tag{10}$$

where $\rho_i$ represents density of each material, $w_i$ represents weight fraction of each material, $K_f$ represents conversion factor for weight fraction to volume fraction. Further, n may represent a salt or solute, solvent, or mixture of solvent.

Microwave penetration depth may be defined as the distance at which the microwave field intensity decreases to 37% of its incident value, which may be calculated from the following equation (11), $$D_{salts} = \frac{c}{2\pi f}\left[0.5\varepsilon'\left(\sqrt{1+\left(\frac{\varepsilon''}{\varepsilon'}\right)^2}-1\right)\right]^{-1/2} \tag{11}$$

where, c represents velocity of light and f represents electromagnetic waves frequency.

The penetration depth $D_p$ in the materials is calculated from the known values of dielectric constant ($\varepsilon'$) and dielectric loss ($\varepsilon''$).

Calibration of the Pulsed Electromagnetic Irradiation System 10

Figure 8:
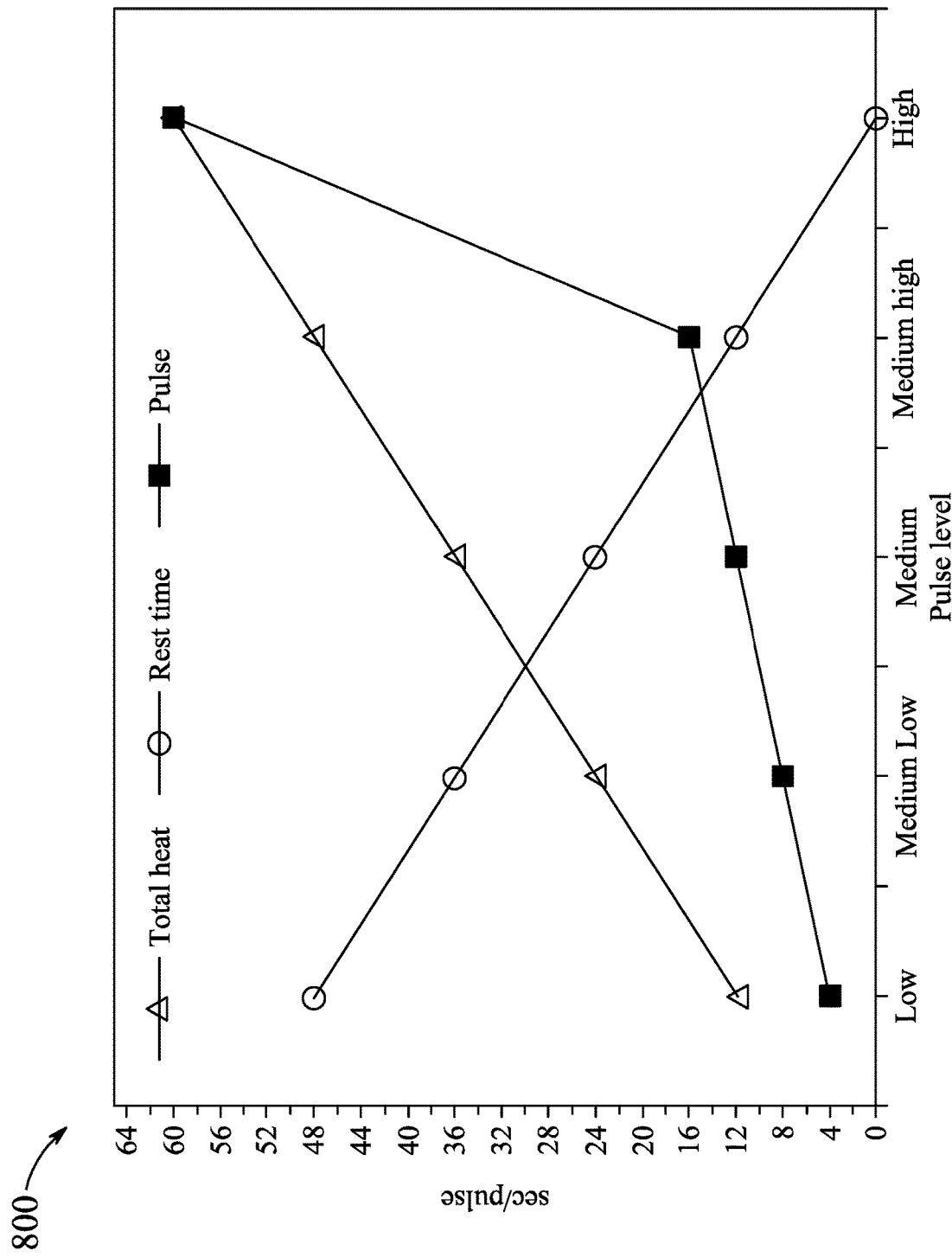
FIG. 8 shows a comprehensive calibration of an electromagnetic pulse cycle level in the multimode cavity, according to exemplary aspects of the present disclosure.

Prior to the water treatment process, desalination process, or distilling process, the pulsed electromagnetic irradiation system 10 may be calibrated to avoid instrument linearity distortions. Also, calibrating the pulsed electromagnetic irradiation system 10 prior to the water treatment process may provide engineering feedback about the contribution to a calibration error of each operational water treatment process within the pulsed electromagnetic irradiation system 10. In an example, the pulsed electromagnetic irradiation system 10 was calibrated using a distilled water quantity of 1000 ml in an open head conical flask as feed. The measurements of electromagnetic radiation absorbance were kept at low to high pulse. FIG. 8 illustrates a graph 800 of comprehensive calibration of an electromagnetic pulse cycle level in the multimode cavity 51. In particular, FIG. 8 shows the pulse On and Off cycle levels of the pulsed electromagnetic irradiation system 10. The thermocouple is used to measure a temperature of each pulse power level. As can be seen in FIG. 8, the electromagnetic operating frequency pulse has five power levels, which are low, medium low, medium, medium high, and high. The measurement results are relatively close to results measured by the time-domain measurement method. Further, each experiment was run at a low to high cycle pulse for a 10 to 60 second interval of time. Table 2 shows the power distribution of the pulsed electromagnetic irradiation system 10.

TABLE 2

Pulsed electromagnetic irradiation system power distribution

| Power level | Low | Medium-Low | Medium | Medium-High | High | Stirring Motor & Water Pump (watts) |
|---|---|---|---|---|---|---|
| Power level Heat Pulses (watts) | 100 | 300 | 450 | 600 | 800 | 25 & 50 |
| Energy Consumption (%) | 12.5 | 37.5 | 56.2 | 75 | 100 | |
| Total Pulse Per 60 (sec) | 3 | 3 | 3 | 3 | Full | |
| Radiation time per pulse (sec) | 4 | 8 | 12 | 16 | 60 | |
| Total heat °C./60 sec | 12 | 24 | 36 | 48 | 60 | |
| Off Time per pulsed (sec) | 16 | 12 | 8 | 4 | 0 | |
| Total off time in 60 sec | 48 | 36 | 24 | 12 | 0 | |

Prior to the water treatment process, the actual power output may have to be determined, which can be different from the capacity of the magnetron generator 60 (declared by manufacturer due to the customization process). The nominal power of the pulsed electromagnetic irradiation system 10 was 900 watts. The calorimetric method can be used to measure output power in an electromagnetic oven both by manufacturers and researchers and was adopted in the present disclosure. The sample used in this experimental setup was distilled water with an initial temperature of 25±2° C. The distilled water of 1000 ml was emptied into the feed reactor 61. Before infusing the electromagnetic pulse level, the distilled water was stirred. Both initial and final temperatures were recorded using a thermocouple fiber-optic instrument connected to a digital-analog meter. The thermocouple can also be equipped with a computer or recorder data acquisition system. The digital-analog meter recorded all the temperatures at atmospheric pressure during the water treatment process. The water was continuously stirred, and the final temperature was read.

Table 3 shows the power distribution of the magnetron generator 60 for each pulse. The power absorbed, $P_{absorbed}$, was calculated using the equation 1 for the various live heat pulses. These values are tabulated in Table 3 provided below.

Table 3 shows the calibration of the pulsed electromagnetic irradiation system 10 containing 1000 ml water. In all the tests, the input power was noted at low to high pulse ranges. Calibration as each pulse level was carried out in triplicate readings, and the mean value was recorded. The source input voltage was 220 V at 50 Hz. The experimental results show the maximum output power of the multimode cavity 51 to be 870 W, which is 93.4% of the nominal value of 900 W. It was also observed that the rate of temperature change with time increased at higher pulses. These results were expected since the dielectric loss of water is small.

TABLE 3

Calibration of Pulsed electromagnetic irradiation system to heat water (1000 ml) at 26° C.

| Heat Pulses | Time, t (Sec.) | Initial Temp. $T_o$ (° C.) | Final Temp. $T_f$ (° C.) | ΔT ° C. | ΔT/t ° C./sec | $P_{absorb}$ watts |
|---|---|---|---|---|---|---|
| Low | 60 | 30.1 | 30.9 | 0.9 | 0.015 | 94.23 |
| Med. low | 60 | 31.0 | 34.0 | 3.0 | 0.05 | 194.3 |
| Med. | 60 | 32.7 | 37.5 | 4.8 | 0.08 | 318.13 |
| Med. high | 60 | 30.7 | 38.1 | 7.4 | 0.12 | 491.85 |
| High | 60 | 33 | 43.5 | 10.5 | 0.17 | 670.01 |

Figure 9:
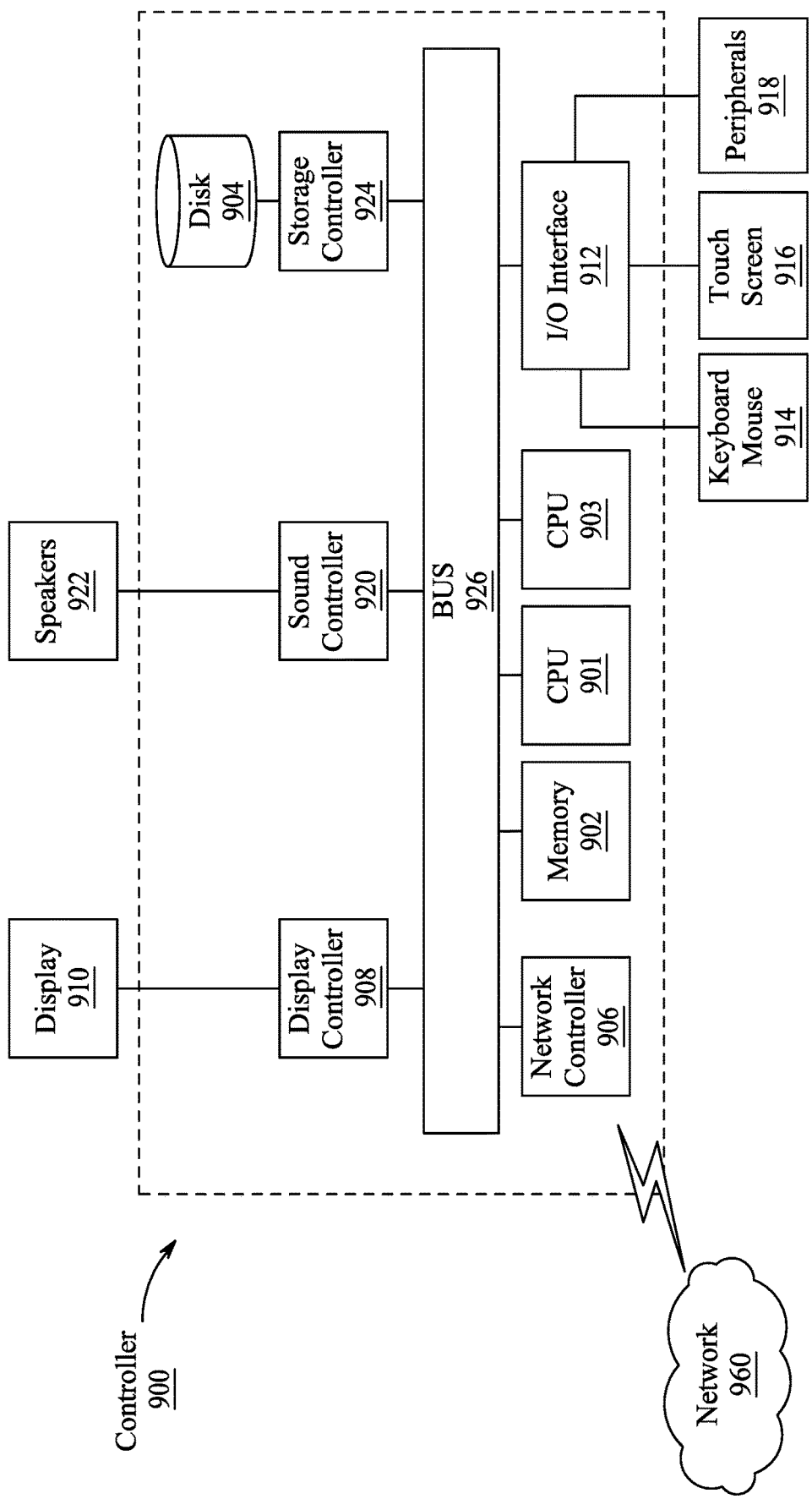
FIG. 9 is an illustration of a non-limiting example of details of computing hardware used in the computing system, according to exemplary aspects of the present disclosure.

FIG. 9 is an illustration of a non-limiting example of details of computing hardware used in the computing system, according to exemplary aspects of the present disclosure. In FIG. 9, a controller 900 is described which is a computing device (for example, computing system 20) and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN sub-networks. The network 960 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
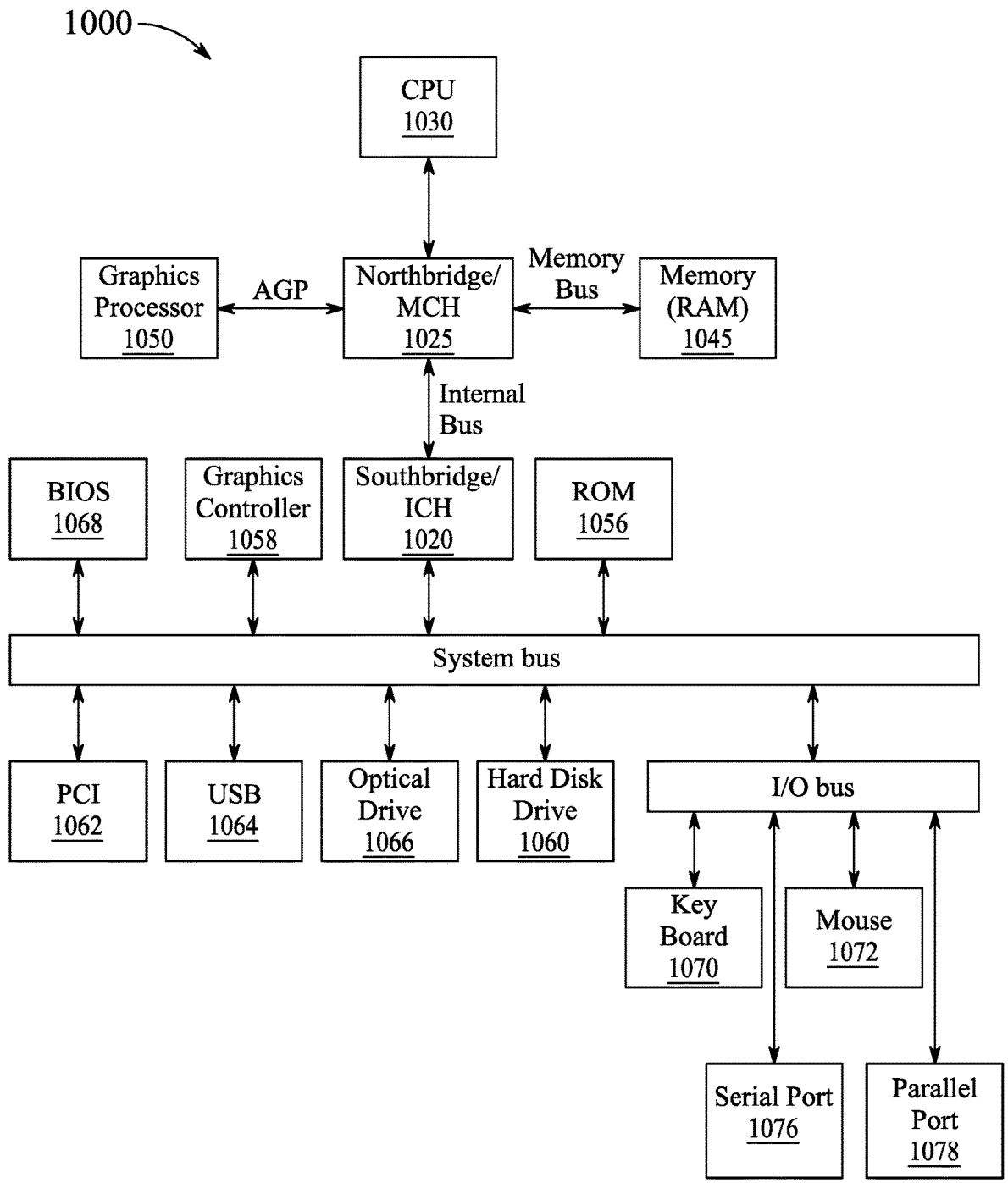
FIG. 10 is an exemplary schematic diagram of a data processing system used within the computing system, according to exemplary aspects of the present disclosure.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
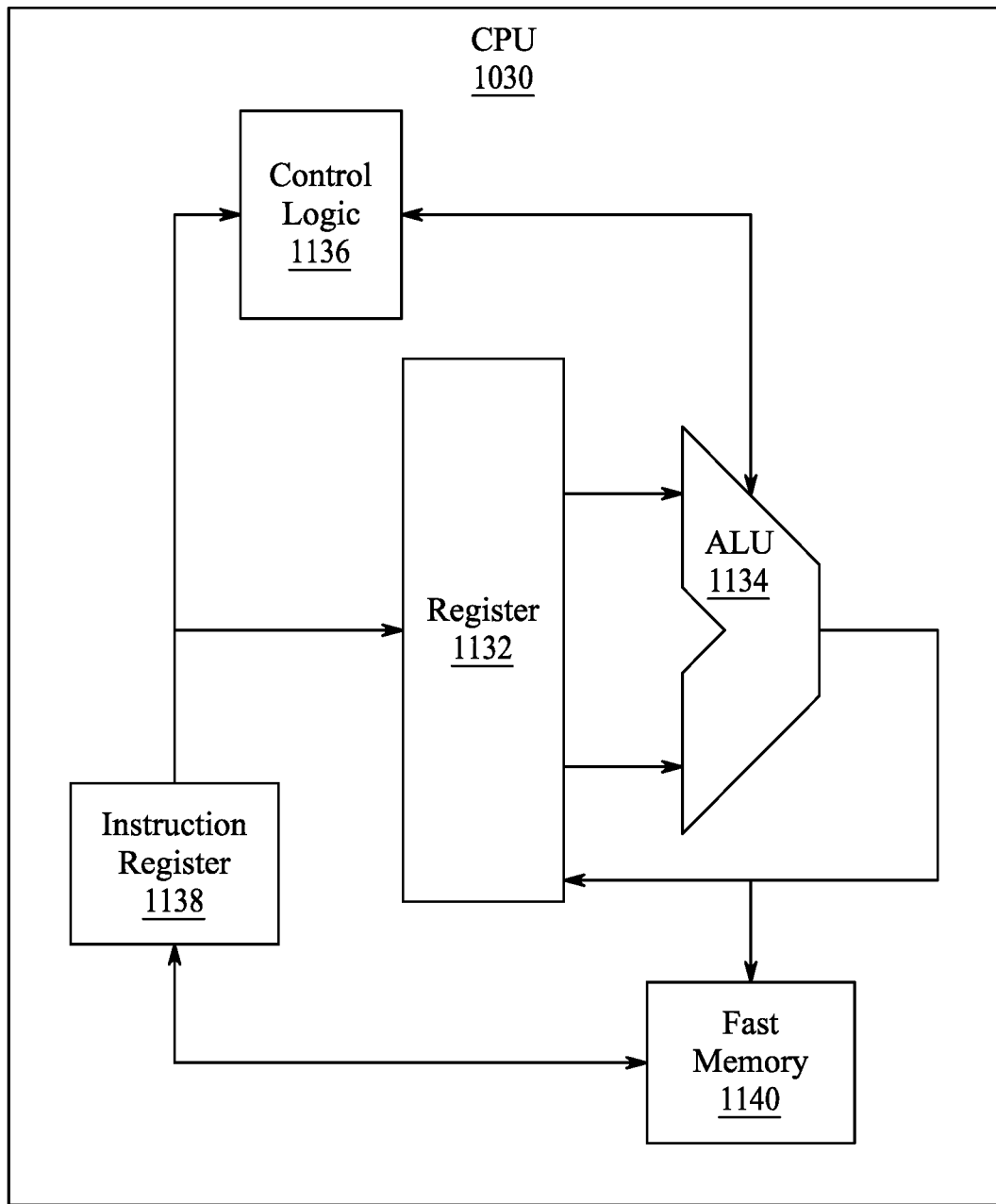
FIG. 11 is an exemplary schematic diagram of a processor used with the computing system, according to exemplary aspects of the present disclosure.

For example. FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1030. Part of the instructions can also be directed to the register 1132. In one aspects of the present disclosure the instructions are decoded according to a hardwired method, and in another aspects of the present disclosure the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1080 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1020 through a PCI bus 1062.

The PCI devices may include, for example, Ethernet adapters, add-in cards, and PC cards for notebook computers. The Hard disk drive 1060 and CD-ROM 1056 can use, for example, an integrated drive electronics (IDE) or serial advanced technology attachment (SATA) interface. In one aspects of the present disclosure the I/O bus can include a super I/O (SIO) device.

Further, the hard disk drive (HDD) 1060 and optical drive 1066 can also be coupled to the SB/ICH 1020 through a system bus. In one aspects of the present disclosure, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
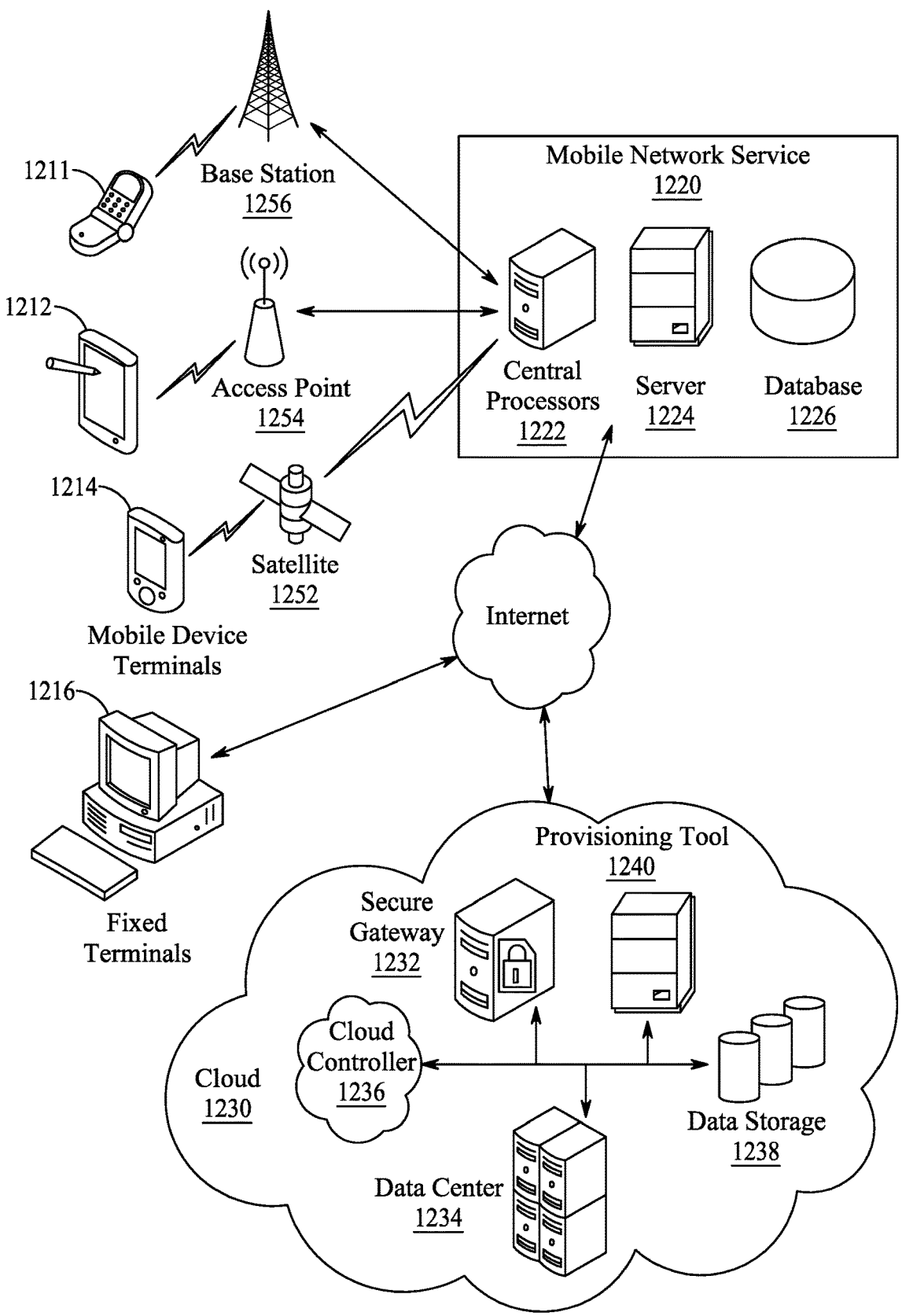
FIG. 12 is an illustration of a non-limiting example of distributed components which may share processing with the controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A pulsed electromagnetic irradiation system for water treatment comprising:
a raw water supply unit, wherein the raw water supply unit is in fluid communication with a feed reactor through a water pump;
a multimode, cavity enclosing the feed reactor;
a brine outlet located at a bottom wall of the multimode cavity;
a temperature sensor operatively connected to the brine outlet to gauge a temperature of a brine discharged through the brine outlet;
a magnetron generator attached to a side wall of the multimode cavity, wherein the magnetron generator is configured to emit microwave pulses, wherein the magnetron generator is laterally and angularly positioned to project the microwave pulses through a duct in the side wall of the multimode cavity to heat the raw water within the multimode cavity until the raw water vaporizes to water vapor;
a power supply located outside of the multimode cavity;
a transformer located outside of the multimode cavity and connected to the power supply, wherein the transformer is operatively connected to provide power from the power supply to the magnetron generator;
a temperature controller located outside of the multimode cavity and between the transformer and the power supply, wherein the temperature controller is operatively connected to switch power to the magnetron generator on and off based on the temperature of the brine;
a stirring motor, wherein the stirring motor is positioned adjacent a bottom surface of the multimode cavity, wherein the stirring motor includes a motor shaft, a neodymium magnetic blade, and a polypropylene coated neodymium magnetic plate embedded on a borosilicate glass ball bearing propeller, the neodymium magnetic plate operatively attached to the motor shaft, wherein the stirring motor is configured to continuously turn the motor shaft to rotate the neodymium magnetic blade to stir the raw water within the feed reactor;
a parabolic arm air cooled condenser, wherein the parabolic arm air cooled condenser is terminally connected by a lid to the feed reactor to be in fluid communication with the feed reactor, wherein the multimode cavity includes an opening in a top surface through which the lid protrudes, and wherein an outer surface of the parabolic arm air cooled condenser has waveform walls configured to provide an increased surface area for heat release from the outer surface;
a gravity vacuum funnel connected to the outer surface of the parabolic arm air cooled condenser, wherein the gravity vacuum funnel is hermetically sealed to a first air/water cooled condenser to transfer water vapor output from the parabolic arm air cooled condenser to the first air/water cooled condenser, and wherein the first air/water cooled condenser is configured to output a first portion of a fresh water stream into a fresh water storage unit;
a second air/water cooled condenser in fluid communication with the water pump;
a third air/water cooled condenser in fluid communication with the second air/water cooled condenser, an intake port of the parabolic arm air cooled condenser and the first air/water cooled condenser; and
a fourth air/water cooled condenser in fluid communication with a water valve at an outlet of the first air/water cooled condenser, wherein the fourth air/water cooled condenser is configured to cool a second portion of the fresh water stream and return the second portion of the cooled fresh water to a reserve water reservoir.

2. The pulsed electromagnetic irradiation system for water treatment of claim 1, wherein the water pump and the stirring motor are operatively electrically connected to a renewable energy source, the renewable energy source including at least one of a wind power turbine and a photovoltaic panel; and
wherein the magnetron generator is operatively electrically connected to receive power from at least one of the photovoltaic panel and a utility grid.

3. The pulsed electromagnetic irradiation system for water treatment of claim 1, wherein the raw water within the feed reactor is at least one of seawater, brackish water, and wastewater.

4. The pulsed electromagnetic irradiation system for water treatment of claim 1, further comprising:
a first thermocouple and a first flow meter connected between the water pump and the second air/water cooled condenser;
a second thermocouple, a first pressure gauge, a second flow meter and a first conductivity meter connected between the second air/water cooled condenser and the third air/water cooled condenser; and
a third thermocouple and a third flow meter connected between the third air/water cooled condenser and the intake port of the parabolic arm air cooled condenser.

5. The pulsed electromagnetic irradiation system for water treatment of claim 1, further comprising:
a plurality of fluid coupling lines configured to provide a hermetically sealed fluid connection between the water pump and the second air/water cooled condenser, the second air/water cooled condenser and the third air/water cooled condenser, the third air/water cooled condenser and the intake port of the parabolic arm air cooled condenser, an upper mouth opening of the parabolic arm air cooled condenser and the first air/water cooled condenser, the first air/water cooled condenser and the fresh water storage unit, the first air/water cooled condenser and the fourth air/water cooled condenser, the fourth air/water cooled condenser and the reserve water reservoir; and a plurality of sensors, each sensor including at least one of thermocouple, a flow meter, a conductivity meter and a pressure gauge, wherein each fluid coupling line includes at least one sensor; and a plurality of water valves configured to control the fluid communication in the fluid coupling lines.

6. The pulsed electromagnetic irradiation system for water treatment of claim 1, wherein the fresh water storage unit includes:

a plurality of layers of activated carbon;

a natural zeolite layer beneath the plurality of layers of activated carbon, wherein a plurality of layers of activated carbon and natural zeolite layer are configured to filter the fresh water entering the fresh water storage unit.

7. The pulsed electromagnetic irradiation system for water treatment of claim 1, wherein the feed reactor and the parabolic arm air cooled condenser are each made of one of glass, ceramic, or polypropylene.

8. The pulsed electromagnetic irradiation system for water treatment of claim 1, wherein the reaction vessel feed reactor has multi-mode inner cavity walls configured to reflect microwaves generated by the magnetron generator to prevent radiation leakage and increase the heating efficiency.

9. The pulsed electromagnetic irradiation system for water treatment of claim 1, further comprising:

an external coating of silver on each of the first air/water cooled condenser, the second air/water condenser, the third air/water condenser and the fourth air/water condenser.

10. The pulsed electromagnetic irradiation system for water treatment of claim 1, wherein the parabolic arm air cooled condenser has four opening mouths including an opening mouth tail, an upper mouth opening, a gravity vacuum funnel opening, and an intake port, wherein the opening mouth tail has a first intake mouth, the upper mouth opening has a fourth exit mouth, the gravity vacuum funnel has a sixth exit mouth and the intake port has a second intake mouth, wherein the second intake mouth of the intake port is configured to feed the liquid from a first coil of a first air/water cooled condenser and a third coil of a third air/water cooled condenser into the reaction vessel, and wherein the four opening mouths are in the following order in relation to the reaction vessel: the opening mouth tail is directly adjacent to the reaction vessel, the intake port is above the opening mouth tail, the gravity vacuum funnel is above the intake port and the upper mouth opening is at the top of the parabolic arm air cooled condenser above the gravity vacuum funnel.

11. The pulsed electromagnetic irradiation system for water treatment of claim 10, wherein an upper width of an upper part of the parabolic arm air cooled condenser above the gravity vacuum funnel is greater than a middle width of a middle part of the parabolic arm air cooled condenser at the gravity vacuum funnel, and a lower width of a lower part of the parabolic arm air cooled condenser at the opening mouth tail and below the intake port is less than the middle width.

* * * * *